United States Patent
Kobayashi

(10) Patent No.: US 11,150,188 B2
(45) Date of Patent: Oct. 19, 2021

(54) CONTROL DEVICE OF IMAGE READING APPARATUS, OPERATION METHOD THEREOF, AND IMAGE DETECTION SYSTEM

(71) Applicant: FUJIFILM Corporation, Tokyo (JP)

(72) Inventor: Takashi Kobayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 533 days.

(21) Appl. No.: 15/493,779

(22) Filed: Apr. 21, 2017

(65) Prior Publication Data

US 2017/0363543 A1  Dec. 21, 2017

(30) Foreign Application Priority Data

Jun. 21, 2016  (JP) .............................. JP2016-122345

(51) Int. Cl.
*G01N 21/64* (2006.01)
*G01N 27/447* (2006.01)

(52) U.S. Cl.
CPC ..... *G01N 21/6456* (2013.01); *G01N 21/6428* (2013.01); *G01N 21/6486* (2013.01); *G01N 27/44717* (2013.01); *G01N 27/44721* (2013.01); *G01N 2021/6419* (2013.01); *G01N 2021/6421* (2013.01); *G01N 2021/6439* (2013.01); *G01N 2201/06193* (2013.01); *G01N 2201/11* (2013.01); *G01N 2223/422* (2013.01)

(58) Field of Classification Search
CPC ........... G01N 21/6456; G01N 21/6486; G01N 21/6428; G01N 2021/6421
USPC ........................................................ 250/587
See application file for complete search history.

(56) References Cited

U.S. PATENT DOCUMENTS

| 4,994,662 A | 2/1991 | Funahashi et al. |
| 5,051,587 A | 9/1991 | Hara et al. |

(Continued)

FOREIGN PATENT DOCUMENTS

| JP | 2007-205774 A | 8/2007 |
| JP | 2013-246187 A | 12/2013 |

OTHER PUBLICATIONS

Anonymous, "GenePix® Pro 7 Software: High Resolution, High Quality Imaging with 4-Laser Excitation", User Guide 0112-0178 Rev B, Jun. 2010, 36 pages total.

(Continued)

*Primary Examiner* — David P Porta
*Assistant Examiner* — Carolyn Fin
(74) *Attorney, Agent, or Firm* — Birch, Stewart, Kolasch & Birch, LLP

(57) ABSTRACT

There are provided a control device of an image reading apparatus, an operation method and an operation program thereof, and an image detection system capable of quickly and easily outputting an image having an appropriate density for analysis from an image reading apparatus. An image receiving unit receives a pre-image output in pre-scanning performed before main scanning for outputting a main image for analysis in an image reading apparatus. A region information receiving unit receives information of a region in the pre-image designated by a user. A calculation unit calculates an appropriate voltage value that is a voltage value of the photomultiplier at which a density of the region becomes an appropriate density for analysis. A scanning conditions setting unit sets the appropriate voltage value as temporary scanning conditions of main scanning.

15 Claims, 27 Drawing Sheets

(56) References Cited

U.S. PATENT DOCUMENTS 5,124,913 A    6/1992   Sezan et al.
8,274,061 B2   9/2012   Matsushita et al.

OTHER PUBLICATIONS

Partial European Search Report dated Nov. 7, 2017, for corresponding European Application No. 17168073.9.
Anonymous, "Amersham (TM) Typhoon Operating Instructions", Aug. 1, 2016, XP055417758, 141 pages.
Extended European Search Report dated Mar. 29, 2018, for corresponding European Application No. 17168073.9.
Pickett et al., "Determining the Signal-to-Noise Ratio and Optimal Photomultiplier gain setting in the GenePix 400B", GenePix Application Note, Jan. 1, 2011, XP055460781, pp. 1-5.
Takamatsu et al., "Development of a Next-Generation Laser-Scanner System for Life Science Research", Fujifilm Research & Development, vol. 62, Jan. 1, 2017, XP055460915, pp. 22-29.
Wang et al., "PMT Adjustment in GenePix 4000B", GenePix Application Note, Jan. 1, 2001, XP055460781, pp. 1-4.
European Office Action, dated Apr. 15, 2019, for corresponding European Application No. 17168073.9.
Japanese Office Action, dated Jun. 4, 2019, for Japanese Application No. 2016-122345, with an English machine translation.
Molecular Devices, "GenePix® Pro 7 Software, High Resolution, High Quality Imaging with 4-Laser Excitation," User Guide, 0112-0178 Rev B, Jun. 2010, pp. 3-20, 36-51 (37 pages total).

FIG. 7

76P — PRE-SCANNING CONDITIONS (IMAGING MENU 3)
PRE-SCANNING CONDITIONS (IMAGING MENU 2)
PRE-SCANNING CONDITIONS (IMAGING MENU 1)

| SET OF EXCITATION LIGHT SOURCE AND FILTER | | (R) RED EXCITATION LIGHT SOURCE - RED FILTER<br>(G) GREEN EXCITATION LIGHT SOURCE - GREEN FILTER<br>(B) BLUE EXCITATION LIGHT SOURCE - BLUE FILTER |
|---|---|---|
| VOLTAGE VALUE OF PHOTOMULTIPLIER | | HVP |
| RESOLUTION | READING INTERVAL | 1000 $\mu$m |
| | SCANNING SPEED | HIGH SPEED |
| IMAGE PROCESSING | | SIMPLE |

FIG. 8

76M — TEMPORARY SCANNING CONDITIONS (IMAGING MENU 3)
TEMPORARY SCANNING CONDITIONS (IMAGING MENU 2)
TEMPORARY SCANNING CONDITIONS (IMAGING MENU 1)

| SET OF EXCITATION LIGHT SOURCE AND FILTER | | (R) RED EXCITATION LIGHT SOURCE - RED FILTER<br>(G) GREEN EXCITATION LIGHT SOURCE - GREEN FILTER<br>(B) BLUE EXCITATION LIGHT SOURCE - BLUE FILTER |
|---|---|---|
| VOLTAGE VALUE OF PHOTOMULTIPLIER | | |
| RESOLUTION | READING INTERVAL | 50 $\mu$m |
| | SCANNING SPEED | NORMAL |
| IMAGE PROCESSING | | NORMAL |

FIG. 9

VARIABLE TABLE — 77

| IMAGING MENU | SET OF EXCITATION LIGHT SOURCE AND FILTER | RESOLUTIONS OF PRE-IMAGE AND MAIN IMAGE | VARIABLE |
|---|---|---|---|
| 1 | (R) RED EXCITATION LIGHT SOURCE – RED FILTER | 1000 μm (HIGH SPEED) 50 μm (NORMAL) | α1-R |
|  | (G) GREEN EXCITATION LIGHT SOURCE – GREEN FILTER |  | α1-G |
|  | (B) BLUE EXCITATION LIGHT SOURCE – BLUE FILTER |  | α1-B |
| 2 | RED EXCITATION LIGHT SOURCE – RED FILTER | 1000 μm (NORMAL) 100 μm (NORMAL) | α2 |
| 3 | BLUE EXCITATION LIGHT SOURCE – RED FILTER | 1000 μm (HIGH SPEED) 50 μm (NORMAL) | α3 |
| ... | ... | ... | ... |

CONTROL DEVICE OF IMAGE READING APPARATUS, OPERATION METHOD THEREOF, AND IMAGE DETECTION SYSTEM

CROSS-REFERENCE TO RELATED APPLICATION

This application claims priority under 35 USC 119 from Japanese Patent Application No. 2016-122345, filed 21 Jun. 2016, the disclosure of which is incorporated by reference herein.

BACKGROUND OF THE INVENTION

1. Field of the Invention

The present invention relates to a control device of an image reading apparatus, an operation method thereof, and an image detection system.

2. Description of the Related Art

An image reading apparatus that detects light from an image carrier carrying image information and outputs an image is known. As an element for detecting light, a photomultiplier is used. The image carrier contains, as a sample, for example, a fluorescently labeled biological substance, such as deoxyribonucleic acid (DNA), ribonucleic acid (RNA), or protein, or a fluorescent protein that has a fluorescence property by gene expression. The image is used for various biochemical analyses, such as identification of proteins expressed in relation to a specific disease. In this case, the image reading apparatus emits excitation light of a fluorescent dye or a fluorescent protein to the image carrier, and fluorescence excited by the excitation light is detected by the photomultiplier. The density of the image can be changed by changing the voltage value of the photomultiplier.

An image reading apparatus disclosed in JP2002-195948A (corresponding to U.S. Pat. No. 8,274,061) performs pre-scanning using a voltage value set by a user as a voltage value of a photomultiplier and generates a simulation image in the case of changing the voltage value based on a pre-image obtained by the pre-scanning. The simulation image is drawn at a density corresponding to the set voltage value. The pre-image and the simulation image are provided for viewing by the user.

In JP2002-195948A, the user observes the pre-image to determine whether or not the pre-image has a density that the user desires. Then, in a case where it is determined that the pre-image does not have a desired density, the user sets a voltage value, which is predicted by the user that the desired density is obtained, and gives an instruction to generate and display a simulation image in the case of the set voltage value. In the main scanning for outputting a main image for analysis, the voltage value set in the event that the user determines that the density of the simulation image is the desired density is set in the photomultiplier.

In JP2002-195948A, a voltage value to be set is left to the user's prediction. For this reason, in a case where the density of the simulation image is contrary to the user's prediction, it is necessary to repeatedly set a voltage value and check a simulation image until a simulation image having a desired density is generated and displayed. This was troublesome.

SUMMARY OF THE INVENTION

It is an object of the invention to provide a control device of an image reading apparatus, an operation method thereof, and an image detection system capable of quickly and easily outputting an image having an appropriate density for analysis from an image reading apparatus.

In order to solve the aforementioned problem, a control device of an image reading apparatus of the invention is a control device of an image reading apparatus having a photomultiplier that detects light from an image carrier carrying image information. The control device of an image reading apparatus of the invention comprises: an image receiving unit that receives a pre-image output in pre-scanning performed before main scanning for outputting a main image for analysis in the image reading apparatus; a region information receiving unit that receives information of a region in the pre-image designated by a user; a calculation unit that calculates an appropriate voltage value that is a voltage value of the photomultiplier at which a density of the region becomes an appropriate density for analysis; and a scanning conditions setting unit that sets pre-scanning conditions, which are scanning conditions of the pre-scanning, and main scanning conditions, which are scanning conditions of the main scanning, and that sets the appropriate voltage value as the main scanning conditions.

It is preferable that the image carrier contains a fluorescently labeled biological substance or a fluorescent protein having a fluorescence property by gene expression and the light is fluorescence emitted from a fluorescent dye or the fluorescent protein, and it is preferable that at least one excitation light source that emits excitation light of the fluorescent dye or the fluorescent protein and at least one filter that cuts the excitation light and transmits the fluorescence are provided in the image reading apparatus.

It is preferable that a plurality of the excitation light sources having different emission wavelength bands are prepared and that, in a case where the plurality of excitation light sources are used in the main scanning, the pre-scanning is performed by each of the plurality of excitation light sources.

It is preferable that the image receiving unit receives a plurality of the pre-images corresponding to the plurality of excitation light sources, which are output in the pre-scanning performed by each of the plurality of excitation light sources, the region information receiving unit receives information of the region for each of the plurality of pre-images, and the calculation unit calculates the appropriate voltage value for each of the plurality of regions designated for the plurality of pre-images.

It is preferable that the regions that are common in the plurality of pre-images are designated. It is preferable that the regions that are different in the plurality of pre-images are designated.

It is preferable that, in the pre-scanning conditions, a resolution of the pre-image lower than a resolution of the main image is set and/or image processing simpler than image processing performed on the main image is set.

It is preferable that, after the information of the region is received by the region information receiving unit, the scanning conditions setting unit sets second pre-scanning conditions, which are different from the pre-scanning conditions, for the region and makes the image reading apparatus perform second pre-scanning and that the calculation unit calculates the appropriate voltage value based on an image of the region output in the second pre-scanning. In this case, it is preferable that, in the second pre-scanning conditions, the same resolution as a resolution of the main image of the main scanning conditions is set, and/or the same image processing as image processing performed on the main image is set.

It is preferable that the calculation unit calculates the appropriate voltage value using a calculation equation having at least a representative value of the density of the region and the voltage value of the pre-scanning conditions as variables.

It is preferable that a plurality of the excitation light sources having different emission wavelength bands are prepared and a plurality of the filters having different transmission wavelength bands are prepared and that the calculation equation further has variables regarding a set of the excitation light source and the filter to be used and a resolution of the pre-image and a resolution of the main image.

It is preferable to further comprise a mode switching unit that performs switching between an automatic setting mode in which the voltage value of the main scanning conditions is automatically set to the appropriate voltage value and a manual setting mode in which a user sets the voltage value of the main scanning conditions.

It is preferable to further comprise an output control unit that controls an output of the pre-image, the main image, and the appropriate voltage value.

An operation method of a control device of an image reading apparatus of the invention is an operation method of a control device of an image reading apparatus having a photomultiplier that detects light from an image carrier carrying image information. The operation method of a control device of an image reading apparatus comprises: an image receiving step of receiving a pre-image output in pre-scanning performed before main scanning for outputting a main image for analysis in the image reading apparatus; a region information receiving step of receiving information of a region in the pre-image designated by a user; a calculation step of calculating an appropriate voltage value that is a voltage value of the photomultiplier at which a density of the region becomes an appropriate density for analysis; and a scanning conditions setting step of setting pre-scanning conditions, which are scanning conditions of the pre-scanning, and main scanning conditions, which are scanning conditions of the main scanning, and setting the appropriate voltage value as the main scanning conditions.

An operation program of a control device of an image reading apparatus of the invention is an operation program of a control device of an image reading apparatus having a photomultiplier that detects light from an image carrier carrying image information. The operation program of a control device of an image reading apparatus causes a computer to execute: an image receiving function of receiving a pre-image output in pre-scanning performed before main scanning for outputting a main image for analysis in the image reading apparatus; a region information receiving function of receiving information of a region in the pre-image designated by a user; a calculation function of calculating an appropriate voltage value that is a voltage value of the photomultiplier at which a density of the region becomes an appropriate density for analysis; and a scanning conditions setting function of setting pre-scanning conditions, which are scanning conditions of the pre-scanning, and main scanning conditions, which are scanning conditions of the main scanning, and setting the appropriate voltage value as the main scanning conditions.

An image detection system of the invention is an image detection system comprising an image reading apparatus having a photomultiplier that detects light from an image carrier carrying image information and a console connected to the image reading apparatus. The image detection system comprises: an image receiving unit that receives a pre-image output in pre-scanning performed before main scanning for outputting a main image for analysis in the image reading apparatus; a region information receiving unit that receives information of a region in the pre-image designated by a user; a calculation unit that calculates an appropriate voltage value that is a voltage value of the photomultiplier at which a density of the region becomes an appropriate density for analysis; and a scanning conditions setting unit that sets pre-scanning conditions, which are scanning conditions of the pre-scanning, and main scanning conditions, which are scanning conditions of the main scanning, and that sets the appropriate voltage value as the main scanning conditions.

According to the invention, since the main scanning is performed with the appropriate voltage value of the photomultiplier, at which an appropriate density for analysis is obtained and which is calculated based on the pre-image output in the pre-scanning before the main scanning, it is possible to provide a control device of an image reading apparatus, an operation method thereof, and an image detection system capable of quickly and easily outputting an image having an appropriate density for analysis from the image reading apparatus.

BRIEF DESCRIPTION OF THE DRAWINGS

FIG. 7 is a diagram showing the contents of pre-scanning conditions.

FIG. 8 is a diagram showing the contents of temporary scanning conditions.

FIG. 9 is a diagram showing the contents of a variable table.

DESCRIPTION OF THE PREFERRED EMBODIMENTS

First Embodiment

Figure 1:
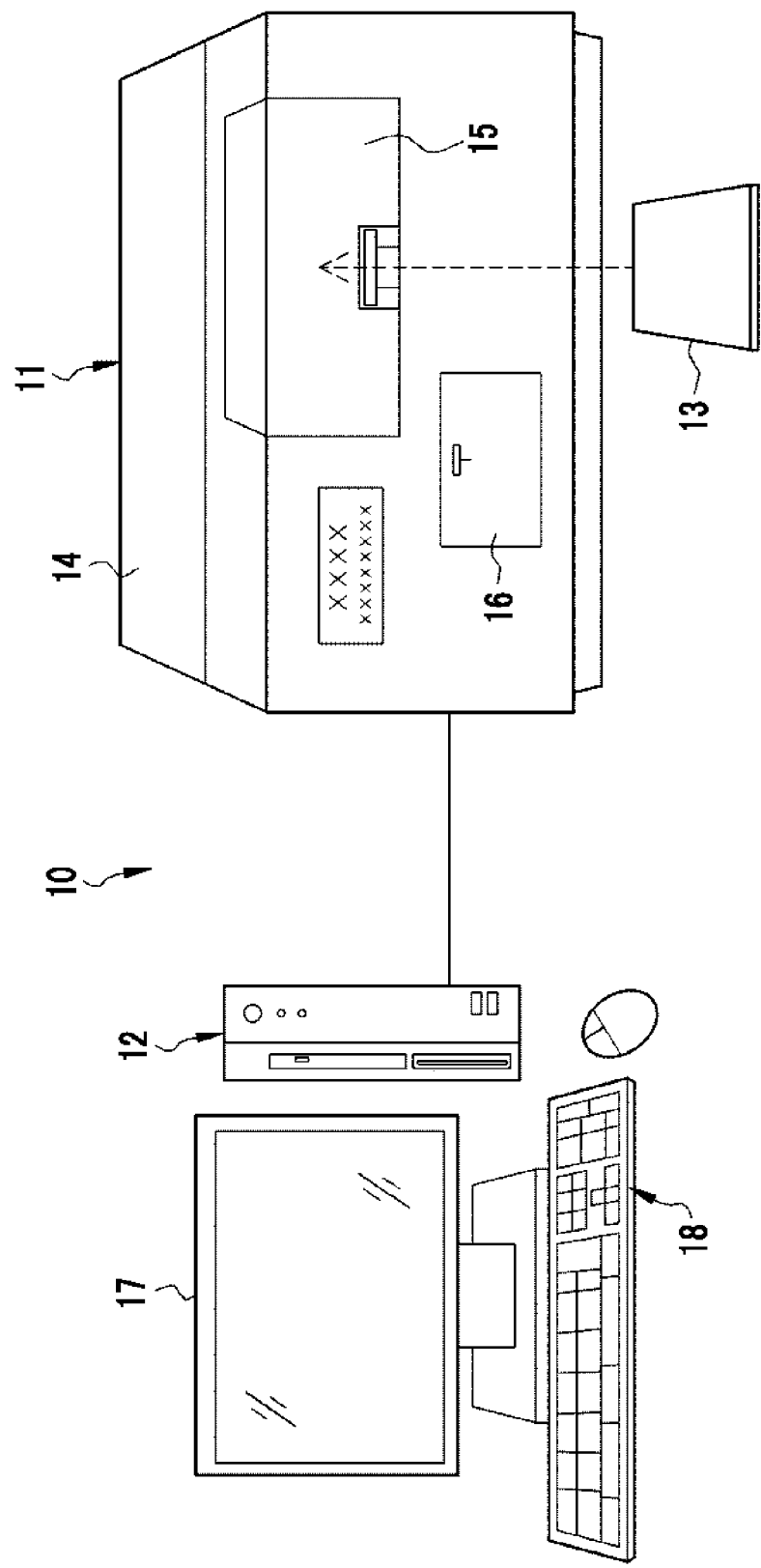
FIG. 1 is a diagram showing an image detection system.

In FIG. 1, an image detection system 10 includes an image reading apparatus 11 and a console 12 corresponding to a control device for the image reading apparatus 11. The image reading apparatus 11 and the console 12 are connected to each other by, for example, a communication cable based on the universal serial bus (USB) standard, so that transmission and reception of data therebetween are possible.

The image reading apparatus 11 detects light DL (refer to FIG. 2 or the like) from an image carrier 13 carrying image information, and outputs an image based on the detected light DL. The image carrier 13 is a gel support or a transfer support on which an electrophoretic pattern of a biological substance as a sample, such as DNA, RNA, or protein, or an electrophoretic pattern of a biological substance containing a fluorescent protein, which has a fluorescence property by gene expression, is recorded. Or, the image carrier 13 is a cell or biological tissue containing a fluorescent protein.

The biological substance is fluorescently labeled. The fluorescent protein has a fluorescence property. For this reason, the light DL to be detected is fluorescence emitted from a fluorescent dye or a fluorescent protein. There is a plurality of kinds of fluorescent dyes or fluorescent proteins, and excitation wavelengths and emission wavelengths thereof are different. For example, a fluorescent dye C2 is excited by blue excitation light, which will be described later, and emits blue fluorescence having a longer wavelength than the blue excitation light. A fluorescent dye C3 is excited by green excitation light, which will be described later, and emits green fluorescence having a longer wavelength than the green excitation light. A fluorescent dye C5 is excited by red excitation light, which will be described later, and emits red fluorescence having a longer wavelength than the red excitation light. For example, the fluorescent dye C2 is Cy2 (registered trademark), the fluorescent dye C3 is Cy3 (registered trademark), and the fluorescent dye C5 is Cy5 (registered trademark). For example, in the case of green fluorescent protein (green fluorescent protein; GFP), the fluorescent protein is excited by blue excitation light and emits green fluorescence. In addition, yellow fluorescent protein (yellow fluorescent protein; YFP) that emits yellow green fluorescence with green excitation light, red fluorescent protein (red fluorescent protein; RFP) that emits red fluorescence with orange excitation light, and the like are known.

The image carrier 13 may be a stimulable phosphor sheet in which a radiographic image, an autoradiographic image, a radiation diffraction image, an electron microscopic image, and the like are recorded on a stimulable phosphor layer. In this case, the light DL to be detected is photostimulated light emitted from the stimulable phosphor.

The entire image reading apparatus 11 is covered with a housing 14. The housing 14 shields the inside of the image reading apparatus 11 from external light that becomes noise in the detection of the light DL. On the front surface of the housing 14, an openable and closable lid 15 for setting the image carrier 13 in the image reading apparatus 11 is provided. Reference numeral 16 is an openable and closable lid for replacing a filter unit 30 (refer to FIG. 2).

The image reading apparatus 11 performs pre-scanning and main scanning. The pre-scanning is performed before the main scanning according to pre-scanning conditions 76P (refer to FIG. 6). After the pre-scanning is performed, the main scanning is performed according to the main scanning conditions. An image (pre-image) for setting the main scanning conditions is output in the pre-scanning, and an image for analysis (main image) is output in the main scanning.

The console 12 is, for example, a desktop type personal computer, and has a display 17 and an operation unit 18 configured to include a keyboard and a mouse. The display 17 displays a screen used for the operation of the operation unit 18. The screen used for operation forms a graphical user interface (GUI). The console 12 receives an input of an operation instruction from the operation unit 18 through the screen of the display 17. Examples of the operation instruction include selection of an imaging menu, designation of a region in a pre-image, and an instruction to start pre-scanning and main scanning.

Figure 2:
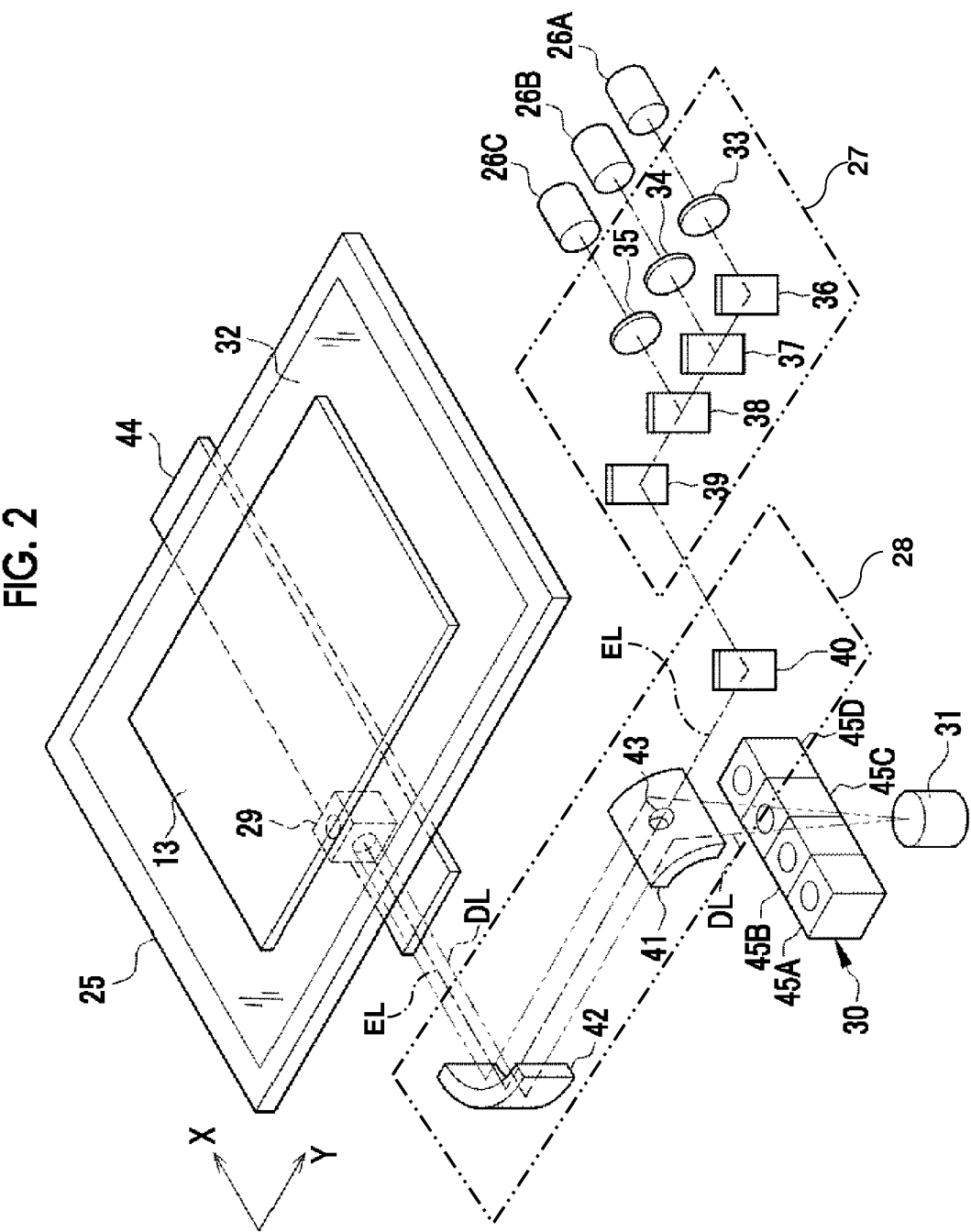
FIG. 2 is a schematic diagram of an image reading apparatus.

In FIG. 2, a stage 25, excitation light sources 26A, 26B, and 26C, a light source optical system 27, a light guiding optical system 28, an optical head 29, a filter unit 30, and a photomultiplier 31 are provided in the image reading apparatus 11.

The stage 25 holds the image carrier 13. The stage 25 has a rectangular frame shape, and a transparent glass plate 32 is fitted in the frame. The image carrier 13 is placed on the glass plate 32.

The excitation light sources 26A to 26C emit excitation light EL (indicated by a one-dot chain line) of a fluorescent dye or a fluorescent protein. In order to correspond to a plurality of kinds of fluorescent dyes or fluorescent proteins, the excitation light sources 26A to 26C having different emission wavelength bands for the excitation light EL are prepared.

Specifically, the excitation light source 26A emits red excitation light having a center wavelength of 635 nm, the excitation light source 26B emits green excitation light having a center wavelength of 532 nm, and the excitation light source 26C emits blue excitation light having a center wavelength of 488 nm. The excitation light sources 26A and 26C are formed by, for example, semiconductor lasers, and the excitation light source 26B is formed by, for example, a second harmonic generation element.

In the following description, the excitation light source 26A may be referred to as the red excitation light source 26A, the excitation light source 26B may be referred to as the green excitation light source 26B, and the excitation light source 26C may be referred to as the blue excitation light source 26C. The excitation light sources 26A to 26C may be referred to collectively as an excitation light source 26. The emission wavelength band of the excitation light EL is not limited thereto. The number of excitation light sources is not limited to three, and one excitation light source may be used or four or more excitation light sources may be used.

The light source optical system 27 is configured to include collimator lenses 33, 34, and 35, mirrors 36 and 39, and dichroic mirrors 37 and 38. The collimator lenses 33 to 35 are arranged on the front surfaces of the excitation light sources 26A to 26C, respectively, and convert excitation light beams of respective colors emitted from the excitation light sources 26A to 26C into parallel beams. The mirror 36 reflects red excitation light converted into parallel light by the collimator lens 33 toward the dichroic mirror 37.

The dichroic mirror 37 transmits the red excitation light from the mirror 36, and reflects green excitation light converted into parallel light by the collimator lens 34 toward the dichroic mirror 38. The dichroic mirror 38 transmits the red excitation light from the mirror 36 and the green excitation light from the dichroic mirror 37, and reflects blue excitation light converted into parallel light by the collimator lens 35 toward the dichroic mirror 39.

The mirror 39 reflects, toward the light guiding optical system 28, the red excitation light that is reflected by the mirror 36 and is transmitted through the dichroic mirrors 37 and 38, the green excitation light that is reflected by the dichroic mirror 37 and is transmitted through the dichroic mirror 38, and the blue excitation light that is reflected by the dichroic mirror 38.

The light guiding optical system 28 is configured to include a mirror 40, a holed concave mirror 41, and a concave mirror 42. The mirror 40 reflects the excitation light EL from the mirror 39 of the light source optical system 27 toward the holed concave mirror 41. The holed concave mirror 41 has a through hole 43 in a central portion. The excitation light EL from the mirror 40 passes through the through hole 43 and travels toward the concave mirror 42. The concave mirror 42 reflects the excitation light EL having passed through the through hole 43 toward the optical head 29.

The light DL (indicated by a two-dot chain line) from the optical head 29 is incident on the concave mirror 42. The concave mirror 42 reflects the light DL toward the holed concave mirror 41. The holed concave mirror 41 reflects the light DL from the concave mirror 42 toward the filter unit 30. In this manner, the holed concave mirror 41 transmits the excitation light EL through the through hole 43 and reflects the light DL toward the filter unit 30, thereby branching the optical paths of the excitation light EL and the light DL.

The optical head 29 emits the excitation light EL to the image carrier 13, and receives the light DL from the image carrier 13. The optical head 29 is disposed on a substrate 44 in the form of an elongated plate provided below the stage 25. The optical head 29 is movable in the main scanning direction X on the substrate 44 by a motor, a rail, or the like (not shown). The substrate 44 and the concave mirror 42 are movable in the sub-scanning direction Y by a motor, a rail, or the like (not shown). That is, the optical head 29 can move in the main scanning direction X and the sub-scanning direction Y, so that the excitation light EL is emitted to the entire surface of the image carrier 13 and the light DL is received from the entire surface of the image carrier 13.

The filter unit 30 is located on the optical path of the light DL between the holed concave mirror 41 and the photomultiplier 31. The filter unit 30 is configured to include four filters 45A, 45B, 45C, and 45D arranged in the sub-scanning direction Y.

Similarly to the substrate 44 and the concave mirror 42, the filter unit 30 is movable in the sub-scanning direction Y by a motor, a rail, or the like (not shown). Accordingly, any one of the filters 45A to 45D is selectively disposed between the holed concave mirror 41 and the photomultiplier 31. More specifically, any one of the filters 45A to 45C is disposed between the holed concave mirror 41 and the photomultiplier 31 in a case where the image carrier 13 is a gel support or a transfer support, and the filter 45D is disposed between the holed concave mirror 41 and the photomultiplier 31 in a case where the image carrier 13 is a stimulable phosphor sheet.

The light DL from the image carrier 13 contains the excitation light EL although the amount of excitation light EL is small. The excitation light EL is noise that is not necessary for generating an image. Therefore, the filters 45A to 45D have characteristics of cutting the excitation light EL and transmitting the light DL.

Similarly to the excitation light sources 26A to 26C, in order to correspond to a plurality of kinds of fluorescence dyes or fluorescent proteins, the filters 45A to 45C having different emission wavelength bands are prepared. Specifically, the filter 45A cuts light (red excitation light) having a wavelength of 635 nm or less, and transmits light (red fluorescence) having a wavelength longer than 635 nm. Specifically, the filter 45B cuts light (green excitation light) having a wavelength of 532 nm or less, and transmits light (green fluorescence) having a wavelength longer than 532 nm. Specifically, the filter 45C cuts light (blue excitation light) having a wavelength of 488 nm or less, and transmits light (blue fluorescence) having a wavelength longer than 488 nm.

In the following description, the filter 45A may be referred to as the red filter 45A, the filter 45B may be referred to as the green filter 45B, and the filter 45C may be referred to as the blue filter 45C. The filters 45A to 45D may be referred to collectively as a filter 45. Similarly to the emission wavelength band of the excitation light EL, the transmission wavelength band of the filter is not limited thereto. The number of filters is not limited to four, and may be one or may be five or more.

The light DL transmitted through the filters 45A to 45D is incident on the photomultiplier 31. The photomultiplier 31 photoelectrically detects the light DL at a predetermined timing, and outputs an analog image signal corresponding thereto.

Figure 3:
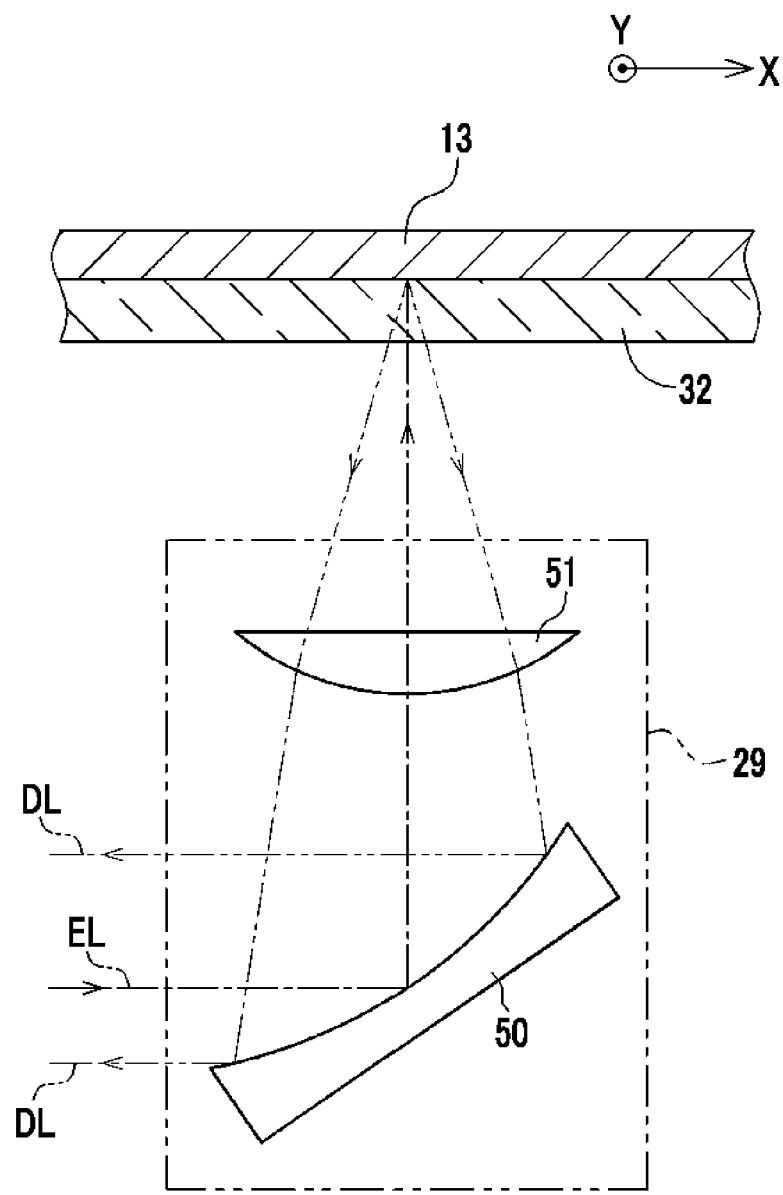
FIG. 3 is a schematic diagram of an optical head.

As shown in FIG. 3, a concave mirror 50 and an aspheric lens 51 are mounted in the optical head 29. The concave mirror 50 reflects the excitation light EL, which is incident from the concave mirror 42 of the light guiding optical system 28, toward the aspheric lens 51. The aspheric lens 51 condenses the excitation light EL from the concave mirror 50 onto the back surface of the image carrier 13 placed on the glass plate 32. In addition, the aspheric lens 51 condenses the light DL that is emitted from the image carrier 13 by the emission of the excitation light EL thereto, and makes the light DL incident on the concave mirror 50. The concave mirror 50 further condenses the light DL from the aspheric lens 51, and makes the light DL incident on the concave mirror 42 of the light guiding optical system 28 as substantially parallel light.

Figure 4:
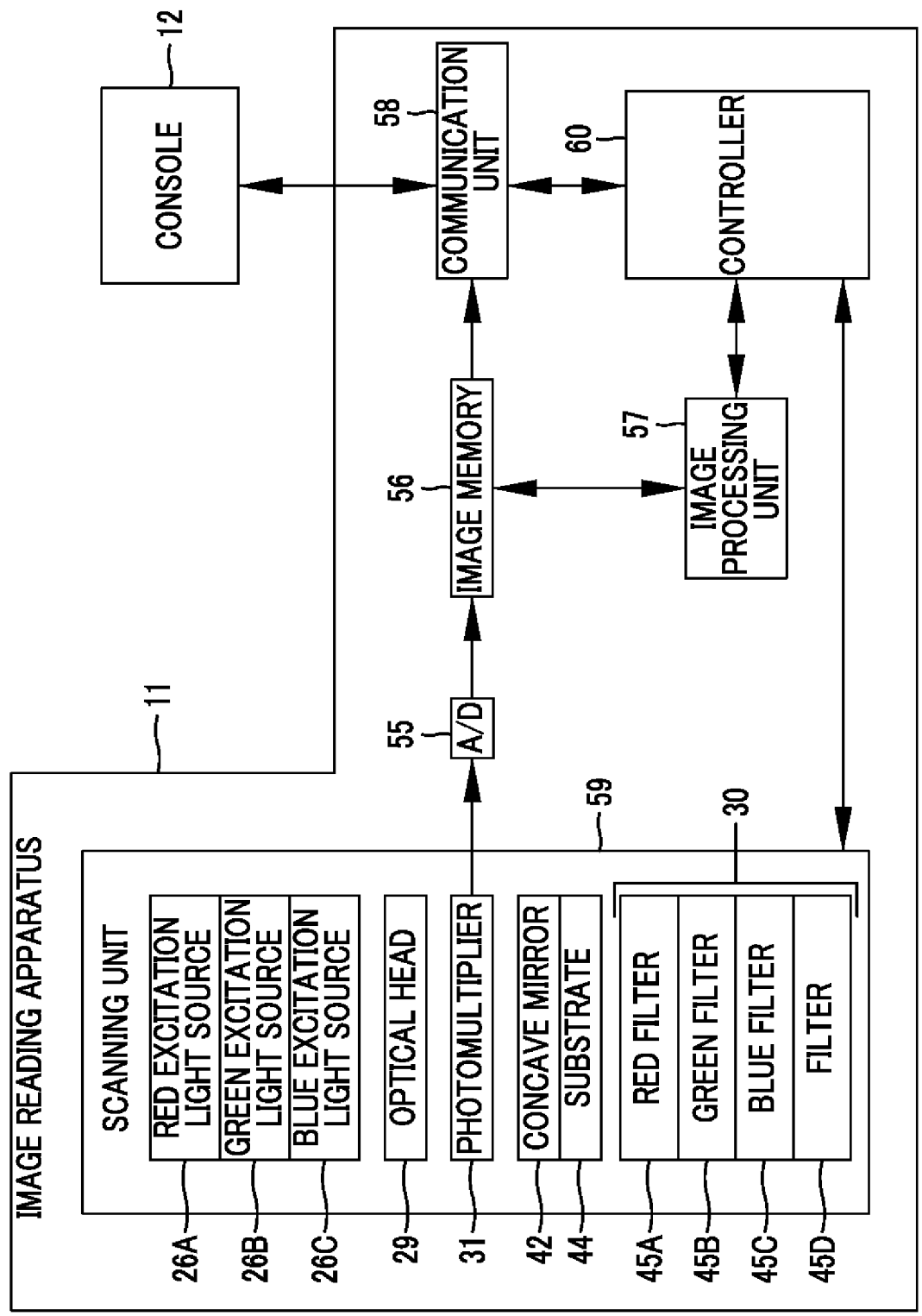
FIG. 4 is a block diagram of an image reading apparatus.

In FIG. 4, an analog/digital (A/D) converter (A/D) 55 is connected to the photomultiplier 31. The A/D 55 sequentially converts analog image signals, which are output sequentially from the photomultiplier 31 at predetermined timings, into digital image signals. The A/D 55 outputs each digital image signal to an image memory 56. The image memory 56 records a digital image signal (image) for one frame obtained by one-time scanning of the optical head 29 for the entire surface of the image carrier 13.

An image processing unit 57 and a communication unit 58 are connected to the image memory 56. The image processing unit 57 performs various kinds of image processing, such as pixel interpolation processing, color correction processing, and gradation processing, on the image recorded in the image memory 56. The communication unit 58 is a USB communication interface, and is responsible for communication of various kinds of data with the console 12. The communication unit 58 receives an image after image processing (a pre-image or a main image) from the image memory 56, and transmits the image to the console 12.

The excitation light sources 26A to 26C, the optical head 29, the photomultiplier 31, the concave mirror 42, the substrate 44, and the filters 45A to 45D (filter unit 30) form a scanning unit 59 that is driven to output an image of the image carrier 13. A controller 60 performs overall control of the scanning unit 59, the image processing unit 57, the communication unit 58, and the like. In particular, the scanning unit 59 performs scanning under the control of the controller 60.

Figure 5:
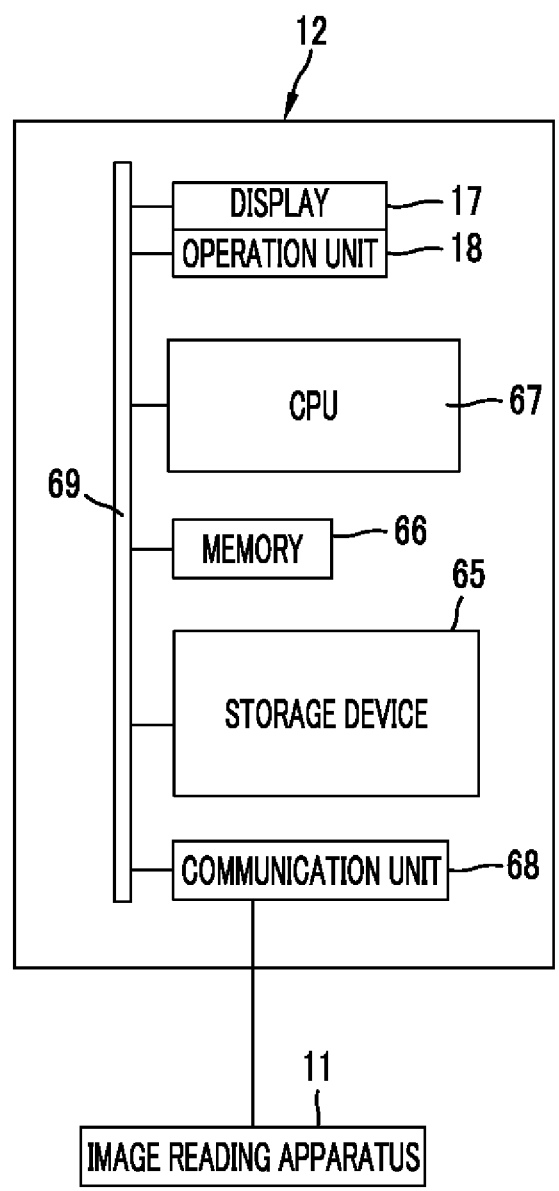
FIG. 5 is a block diagram of a console.

In FIG. 5, in addition to the display 17 and the operation unit 18 described above, the console 12 includes a storage device 65, a memory 66, a central processing unit (CPU) 67, and a communication unit 68. These are connected to each other through a data bus 69.

The storage device 65 is a hard disk drive, which is built into the console 12 or is connected to the console 12 through a cable or a network, or a disk array formed by connecting a plurality of hard disk drives. A control program such as an operating system, various application programs, and various kinds of data associated with these programs are stored in the storage device 65.

The memory 66 is a work memory required in the event that the CPU 67 executes processing. The CPU 67 performs overall control of each unit of the console 12 by loading a program stored in the storage device 65 to the memory 66 and executing the processing according to the program. Similarly to the communication unit 58 of the image reading apparatus 11, the communication unit 68 is a USB communication interface that is responsible for communication of various kinds of data with the image reading apparatus 11.

Figure 6:
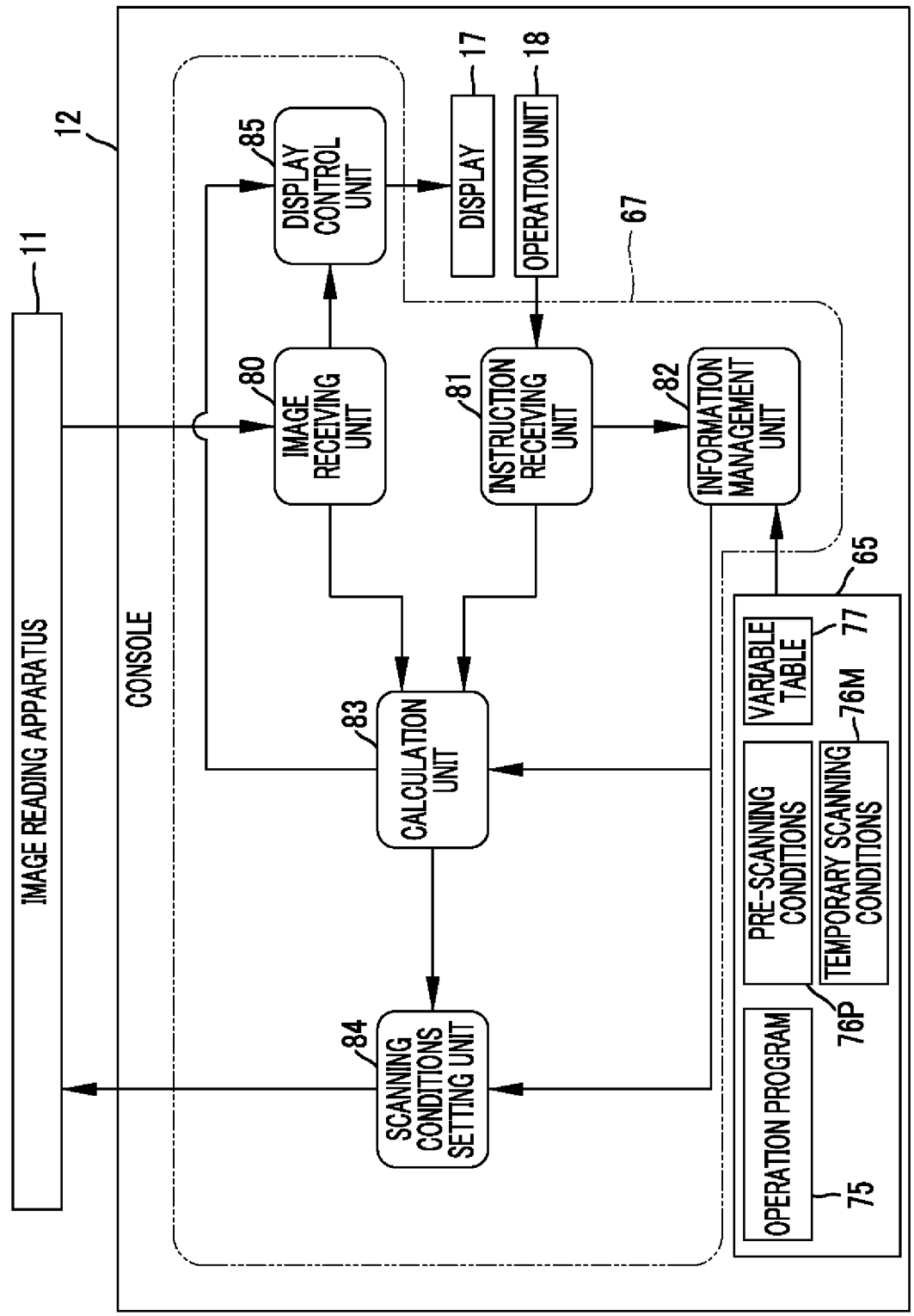
FIG. 6 is a block diagram showing each functional unit of a CPU of the console.

In FIG. 6, an operation program 75 is stored in the storage device 65. The operation program 75 is an application program causing the console 12 to function as a control device for the image reading apparatus 11. In addition to the operation program 75, the pre-scanning conditions 76P (refer to FIG. 7), temporary scanning conditions 76M (refer to FIG. 8), and a variable table 77 (refer to FIG. 9) are stored in the storage device 65.

In the event that the operation program 75 is started, the CPU 67 cooperates with the memory 66 or the like to function as an image receiving unit 80, an instruction receiving unit 81, an information management unit 82, a calculation unit 83, a scanning conditions setting unit 84, and a display control unit 85.

The image receiving unit 80 has an image receiving function for receiving a pre-image and a main image from the image reading apparatus 11. The image receiving unit 80 outputs the pre-image and the main image to the display control unit 85, and outputs the pre-image to the calculation unit 83.

The instruction receiving unit 81 receives an input of an operation instruction from the operation unit 18. Specifically, the instruction receiving unit 81 receives an imaging menu selected by the user through the operation unit 18. The instruction receiving unit 81 outputs the received imaging menu to the information management unit 82.

The instruction receiving unit 81 corresponds to a region information receiving unit, and has a region information receiving function for receiving information of a region (region information) in the pre-image designated by the user through the operation unit 18. The instruction receiving unit 81 outputs the received region information to the calculation unit 83.

Specifically, the region information is two-dimensional coordinates with one pixel among pixels forming the pre-image as the origin. For example, in a case where the region is a rectangle, the region information is the coordinates of one corner of the rectangle and the diagonal of the corner.

The information management unit 82 manages various kinds of information stored in the storage device 65, such as the pre-scanning conditions 76P, the temporary scanning conditions 76M, and the variable table 77. The information management unit 82 reads information, which corresponds to various operation instructions from the instruction receiving unit 81, from the storage device 65, and sends the read information to the calculation unit 83 and the scanning conditions setting unit 84.

The calculation unit 83 has a calculation function for calculating an appropriate voltage value HVM (refer to FIG. 8 or the like) of the photomultiplier 31. The appropriate voltage value HVM is a voltage value at which the density of the region becomes an appropriate density for analysis. The calculation unit 83 outputs the calculated appropriate voltage value HVM to the scanning conditions setting unit 84 and the display control unit 85.

The scanning conditions setting unit 84 has a scanning conditions setting function for setting the pre-scanning conditions 76P and the main scanning conditions. The scanning conditions setting unit 84 sets the appropriate voltage value HVM from the calculation unit 83 as the voltage value of the photomultiplier 31 of the temporary scanning conditions 76M, and sets the temporary scanning conditions 76M as the main scanning conditions. The scanning conditions setting unit 84 outputs the pre-scanning conditions 76P and the main scanning conditions to the image reading apparatus 11.

The display control unit 85 corresponds to an output control unit. The display control unit 85 controls the display output of the pre-image and the main image from the image receiving unit 80 and the appropriate voltage value HVM from the calculation unit 83. Specifically, the display control unit 85 generates a screen 90 (refer to FIGS. 16 to 24) for displaying the pre-image, the main image, and the appropriate voltage value HVM, and outputs the screen 90 to the display 17.

In FIGS. 7 and 8, the pre-scanning conditions 76P and the temporary scanning conditions 76M are prepared for each imaging menu, such as imaging menus 1, 2, 3, . . . . In the pre-scanning conditions 76P and the temporary scanning conditions 76M, items, such as a set of the excitation light source 26 and the filter 45, a voltage value of the photomultiplier 31, resolution, and image processing, are set.

Among these items, items excluding the item of image processing are set in various drivers of the scanning unit 59, such as a driver of the excitation light source 26, a driver of a motor for moving the optical head 29, the substrate 44 and the concave mirror 42, and the filter unit, and a driver of the photomultiplier 31, and the item of image processing is set in the image processing unit 57.

In the items of the set of the excitation light source 26 and the filter 45, a set of the excitation light source 26 and the filter 45 (here, three sets (R), (G), and (B)) to be used in scanning, among the excitation light sources 26A to 26C and the filters 45A to 45D, are registered. At the time of scanning, the excitation light source 26 registered in the item of the set of the excitation light source 26 and the filter 45 is driven, and the registered filter 45 is disposed between the holed concave mirror 41 and the photomultiplier 31. In the item of the voltage value of the photomultiplier 31, a voltage value to be set in the photomultiplier 31 at the time of scanning is registered.

In the item of resolution, the reading interval (pixel pitch) of the light DL and the scanning speed of the optical head 29 that determine the resolution of an image are registered. As the scanning speed, there are "high speed" shown in FIG. 7 and "normal" shown in FIG. 8. The detection timing of the light DL of the photomultiplier 31 is adjusted based on the reading interval registered in the item of resolution. The concave mirror 42 and the substrate 44 are scanned in the sub-scanning direction Y at the registered reading intervals. The optical head 29 is scanned in the main scanning direction X at the registered scanning speed. In a case where "high speed" is registered in the item of scanning speed, the optical head 29 is scanned at a higher scanning speed (for example, •10 speed) than in a case where "normal" is registered.

In the item of image processing, the level of image processing performed on the image by the image processing unit 57 is registered. There are two levels of image processing, that is, "simple" shown in FIG. 7 and "normal" shown in FIG. 8. In a case where the level registered in the item of image processing is "simple", the image processing unit 57 completes the image processing more simply than in a case where the level is "normal".

Simple image processing is, for example, performing no pixel interpolation processing.

In the item of the set of the excitation light source 26 and the filter 45, the same set is registered for the scanning conditions 76P and 76M of the same imaging menu. In the item of the voltage value of the photomultiplier 31, in the pre-scanning conditions 76P, the same default voltage value HVP is uniformly registered regardless of the set of the excitation light source 26 and the filter 45. On the other hand, in the temporary scanning conditions 76M, the item of the voltage value of the photomultiplier 31 is blank. In the pre-scanning conditions 76P, a different default voltage value HVP may be registered for each set.

The resolution of the pre-scanning conditions 76P is the resolution of a pre-image, and the resolution of the temporary scanning conditions 76M is the resolution of a main image. In the item of the reading interval of the resolution of the pre-scanning conditions 76P, a larger value of "1000 μm" than "50 μm" of the temporary scanning conditions 76M is registered. In the item of the scanning speed of the resolution of the pre-scanning conditions 76P, "high speed" is registered compared with "normal" of the temporary scanning conditions 76M.

The reading interval of the pre-scanning conditions 76P is longer than that of the temporary scanning conditions 76M.

Therefore, the pre-image is a low-resolution image in which the pixel size is larger than that in the main image and the number of pixels is smaller than that in the main image. That is, in the pre-scanning conditions 76P, the resolution of the pre-image lower than the resolution of the main image is set.

In the item of image processing, "simple" is registered in the pre-scanning conditions 76P, and "normal" is registered in the temporary scanning conditions 76M. That is, in the pre-scanning conditions 76P, image processing simpler than image processing performed on the main image is set. For this reason, the processing time required for the image processing of the pre-image is shorter than that in the case of the main image. In the item of scanning speed, "high speed" is registered in the pre-scanning conditions 76P, and "normal" is registered in the temporary scanning conditions 76M. Thus, the pre-scanning conditions 76P are conditions in which the pre-scanning ends in a short time compared with the main scanning. In addition, different resolution and image processing may be registered for each set.

Since the reading interval of the pre-scanning conditions 76P is long as described above, there is a possibility that the image information of an important portion can not be obtained or there is a possibility that the image information is not correct. In the present embodiment, therefore, only while performing pre-scanning, the diameter of the excitation light EL in the pre-scanning is made to be larger than that in the case of the main scanning by inserting a beam expander on the optical path of the excitation light EL or by shifting the position of the excitation light source 26 for defocusing, for example. In the event that the diameter of the excitation light EL is increased, the power of the excitation light EL per unit cross-sectional area is weakened. In order to compensate for this, a driving current supplied to the excitation light source 26 is set to be higher than that in the case of the main scanning. In a case where the image carrier 13 is a stimulable phosphor sheet, in order to prevent all pieces of image information carried on the stimulable phosphor sheet from being read by pre-scanning, the power of the excitation light EL per unit cross-sectional area and the resolution are reduced by setting the driving current of the excitation light source 26 to a weak value in the pre-scanning.

In FIG. 9, items of an imaging menu, a set of the excitation light source 26 and the filter 45, resolutions of a pre-image and a main image, and a variable α are set in the variable table 77. In the item of the set of the excitation light source 26 and the filter 45 and the item of resolutions of a pre-image and a main image, a set of the excitation light source 26 and the filter 45 of the respective scanning conditions 76P and 76M corresponding to the imaging menu and the resolutions of the pre-image and the main image are registered. The variable α is a variable used in calculating the appropriate voltage value HVM, and is a variable relevant to the set of the excitation light source 26 and the filter 45 to be used and the resolution of the pre-image and the resolution of the main image. In a case where there are a plurality of sets of the excitation light source 26 and the filter 45 in one imaging menu such as imaging menu 1, the variable α is registered for each of a plurality of sets. For example, α1-R, α1-G, and α1-B are registered for a plurality of sets. The set of the excitation light source 26 and the filter 45 may be a combination that cuts the excitation light EL and transmits the light DL, and there is also a case of different colors as exemplified by the blue excitation light source 26C and the red filter 45A of the imaging menu 3.

Figure 10:
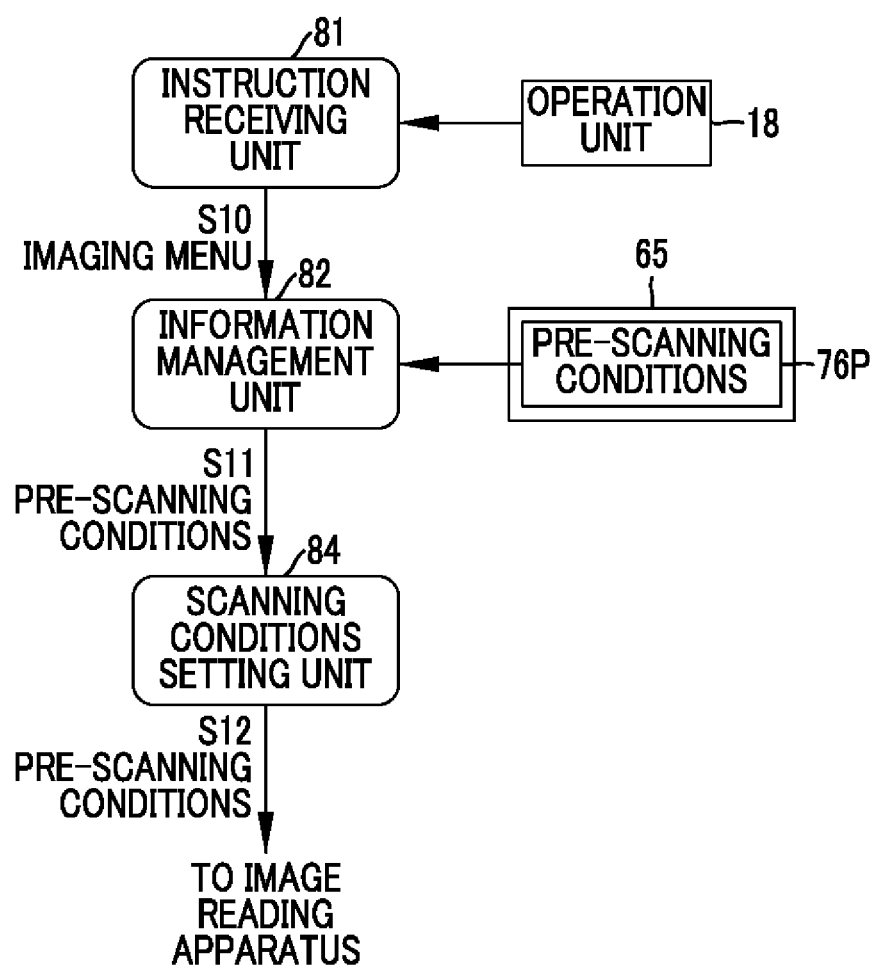
FIG. 10 is a diagram showing a flow of setting of pre-scanning conditions.

In FIG. 10 showing the flow until the pre-scanning conditions 76P are set in the image reading apparatus 11, first, the instruction receiving unit 81 receives an imaging menu selected by the user through the operation unit 18, and outputs the received imaging menu to the information management unit 82 (step S10).

The information management unit 82 reads the pre-scanning conditions 76P corresponding to the imaging menu from the instruction receiving unit 81 from the storage device 65, and sends the read pre-scanning conditions 76P to the scanning conditions setting unit 84 (step S11).

The scanning conditions setting unit 84 outputs the pre-scanning conditions 76P, which have been received from the information management unit 82, to the image reading apparatus 11 as they are (step S12). As described above, the pre-scanning conditions 76P are set in the image reading apparatus 11.

Figure 11:
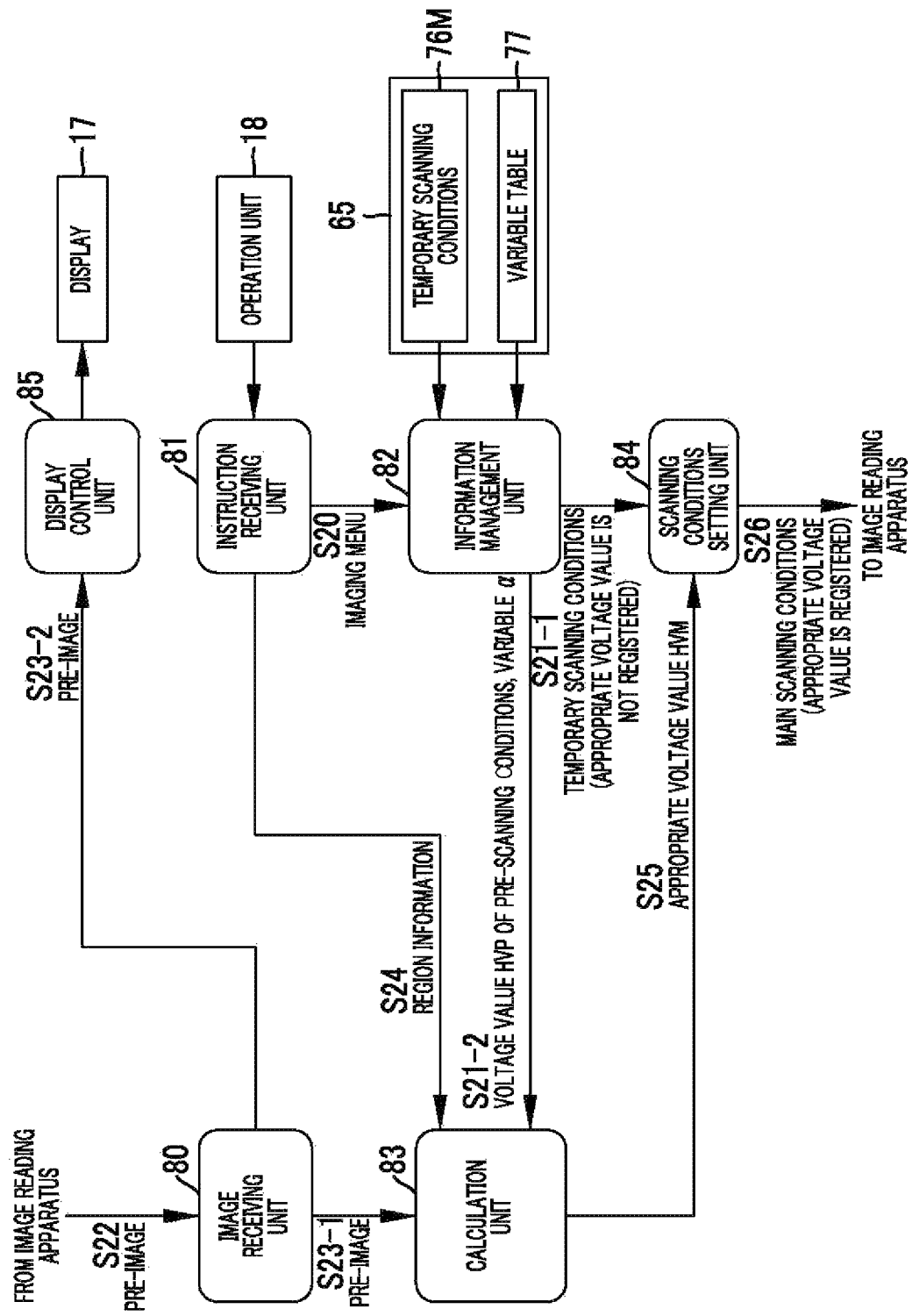
FIG. 11 is a diagram showing a flow of setting of main scanning conditions.

On the other hand, FIG. 11 shows the flow until the main scanning conditions are set in the image reading apparatus 11. Also in this case, the flow (steps S20 and S21-1) until the instruction receiving unit 81 receives an imaging menu and the temporary scanning conditions 76M corresponding to the imaging menu are passed to the scanning conditions setting unit 84 from the information management unit 82 is the same as steps S10 and S11 in FIG. 10. In this case, however, the information management unit 82 reads the voltage value HVP of the photomultiplier 31 of the pre-scanning conditions 76P, the variable α corresponding to the imaging menu from the instruction receiving unit 81, and the like from the storage device 65, and sends these to the calculation unit 83 (step S21-2).

In the item of the voltage value of the photomultiplier 31 of the temporary scanning conditions 76M, nothing is registered in a stage in which the temporary scanning conditions 76M have been passed to the scanning conditions setting unit 84 from the information management unit 82 (appropriate voltage value is not registered). The procedure for registering the appropriate voltage value HVM in the item of the voltage value of the photomultiplier 31, which is blank, to set the main scanning conditions will be described below.

First, after the pre-scanning is ended, the image receiving unit 80 receives a pre-image from the image reading apparatus 11 (step S22). The pre-image is output to the calculation unit 83 (step S23-1), and is output to the display control unit 85 so as to be displayed on the display 17 (step S23-2).

The user observes the pre-image displayed on the display 17, and designates a region by operating the operation unit 18. As a result, the instruction receiving unit 81 receives the region information. The region information is output to the calculation unit 83 (step S24).

The variable α and the voltage value HVP of the photomultiplier 31 of the pre-scanning conditions 76P from the information management unit 82, the pre-image from the image receiving unit 80, and the region information from the instruction receiving unit 81 are input to the calculation unit 83. In a case where the region information is input from the instruction receiving unit 81, the calculation unit 83 starts calculation of the appropriate voltage value HVM.

Specifically, first, a region is extracted from the pre-image from the image receiving unit 80 based on the region information from the instruction receiving unit 81, and a representative value SP of the density of the region is derived. The representative value SP is, for example, a maximum value of the density of the region. Instead of the maximum value, a mode or an average value may be derived as the representative value SP.

The calculation unit 83 calculates the appropriate voltage value HVM using the following calculation equation (1).

$$HVM = HVP \times 10^{[\{\log(ST/SP)+\alpha\}/PMM\_GA]} \quad \ldots (1)$$

Here, ST is an appropriate density for analysis set in advance, and PMM_GA is a basic sensitivity coefficient for the light DL of the photomultiplier 31. ST and PMM_GA are stored in the storage device 65. In step S21-2, the information management unit 82 sends ST and PMM_GA to the calculation unit 83 together with the voltage value HVP of the pre-scanning conditions 76P and the like.

The appropriate density for analysis is a density determined by a public institution in the field of biochemical analysis, or a density determined by the facility where the image detection system 10 is used. Individual users may set appropriate densities for analysis.

In calculation equation (1), the representative value SP of the density of the region and the voltage value HVP of the pre-scanning conditions 76P are assumed to be variables. In addition, calculation equation (1) also has the variable α relevant to the set of the excitation light source 26 and the filter 45 to be used and the resolution of the pre-image and the resolution of the main image.

The calculation unit 83 outputs the calculated appropriate voltage value HVM to the scanning conditions setting unit 84 (step S25). The scanning conditions setting unit 84 registers the appropriate voltage value HVM from the calculation unit 83 in the item of the voltage value of the photomultiplier 31 of the temporary scanning conditions 76M from the information management unit 82. The temporary scanning conditions 76M in which the appropriate voltage value HVM is registered are output to the image reading apparatus 11 from the scanning conditions setting unit 84 as the main scanning conditions (step S26). As described above, the main scanning conditions are set in the image reading apparatus 11.

In addition to the representative value SP of the density of a region in the pre-image, the calculation unit 83 derives a representative value SPall of the density of the entire pre-image. Then, the representative value SPall of the density of the entire pre-image is substituted into calculation equation (1) instead of the representative value SP of the density of the region, and an appropriate voltage value HVMall of the entire pre-image is calculated. The calculation unit 83 outputs the calculated appropriate voltage value HVMall of the entire pre-image to the display control unit 85. In FIGS. 10 and 11, portions not related to the description are not shown. This also applies to the following FIGS. 12 to 14.

Figure 12:
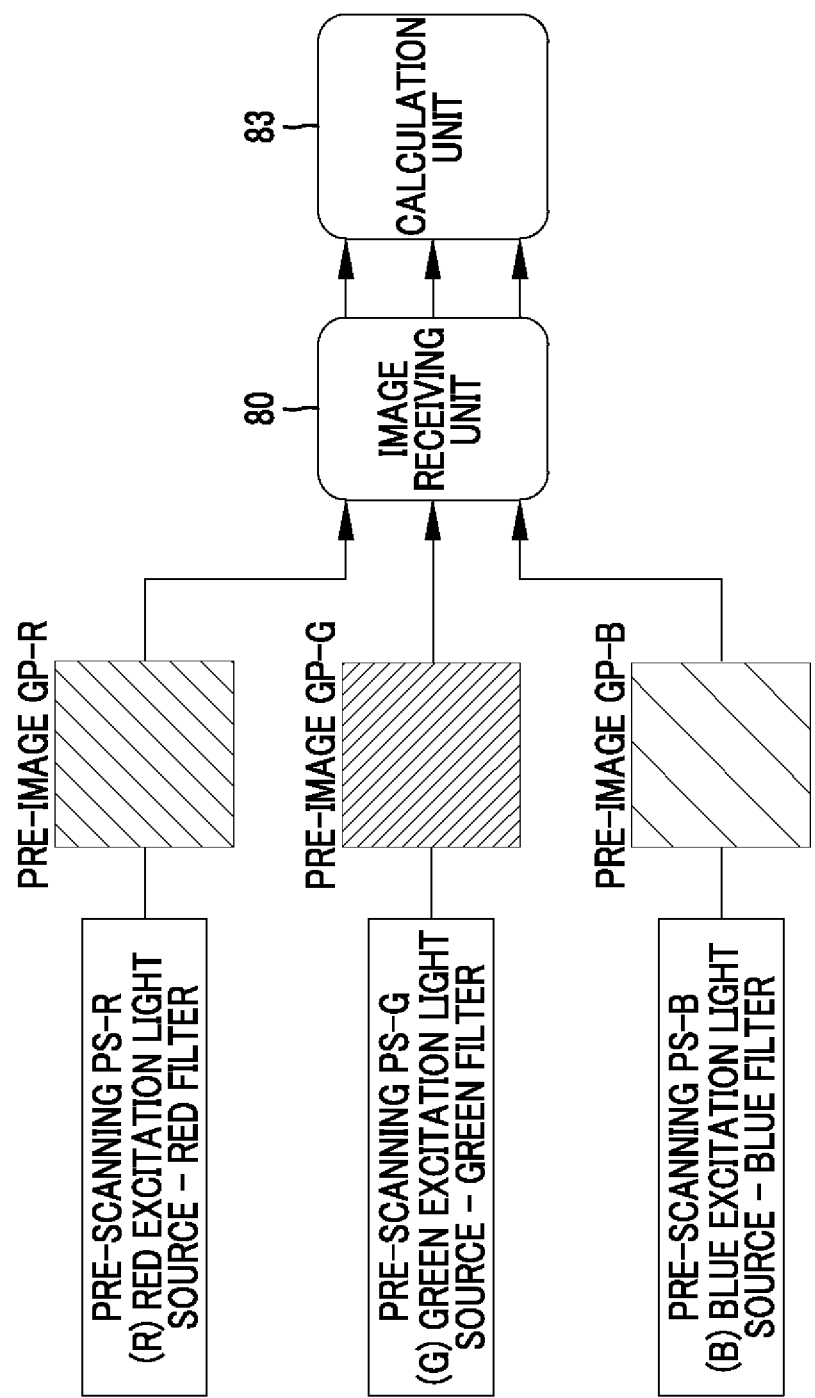
FIG. 12 is a diagram showing how pre-scanning is performed by each of a plurality of excitation light sources and a plurality of pre-images corresponding to the plurality of excitation light sources are received.

As shown in FIG. 12, in a case where a plurality of excitation light sources 26 are used in the main scanning, pre-scanning is performed by each of the plurality of excitation light sources 26, and a plurality of pre-images corresponding to the plurality of excitation light sources 26 are output. In this case, the image receiving unit 80 receives the plurality of pre-images corresponding to the plurality of excitation light sources 26, and outputs the plurality of pre-images to the calculation unit 83.

FIG. 12 illustrates a case in which the imaging menu 1 is selected and pre-scanning PS-R using a set of the red excitation light source 26A and the red filter 45A, pre-scanning PS-G using a set of the green excitation light source 26B and the green filter 45B, and pre-scanning PS-B using a set of the blue excitation light source 26C and the blue filter 45C are separately performed. In this case, a pre-image GP-R corresponding to the red excitation light source 26A, a pre-image GP-G corresponding to the green excitation light source 26B, and a pre-image GP-B corresponding to the blue excitation light source 26C are output, are received by the image receiving unit 80, and are output to the calculation unit 83.

Figure 13:
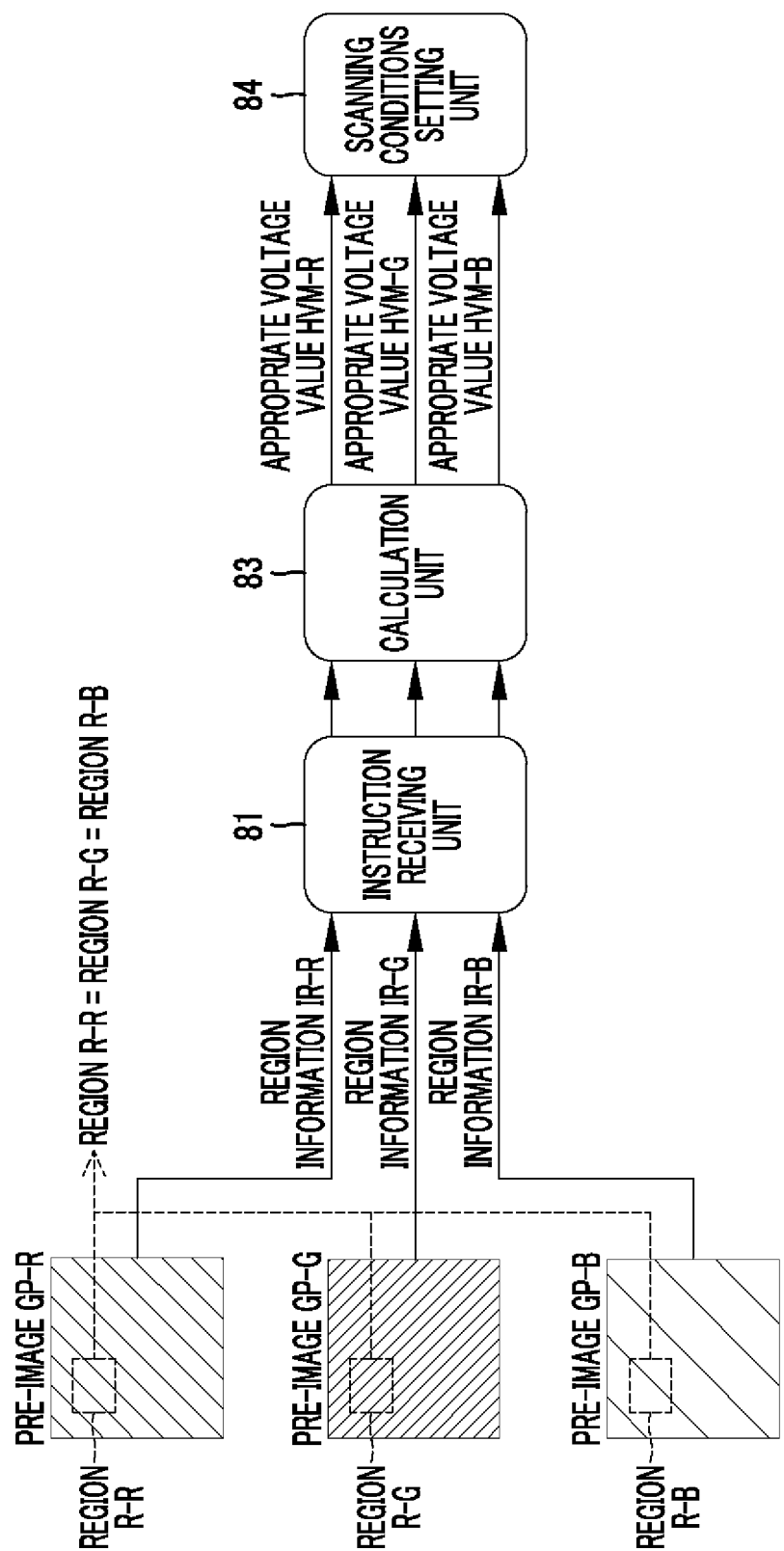
FIG. 13 is a diagram showing how the information of a common region for each of a plurality of pre-images is received and an appropriate voltage value for each of a plurality of regions is calculated.
Figure 14:
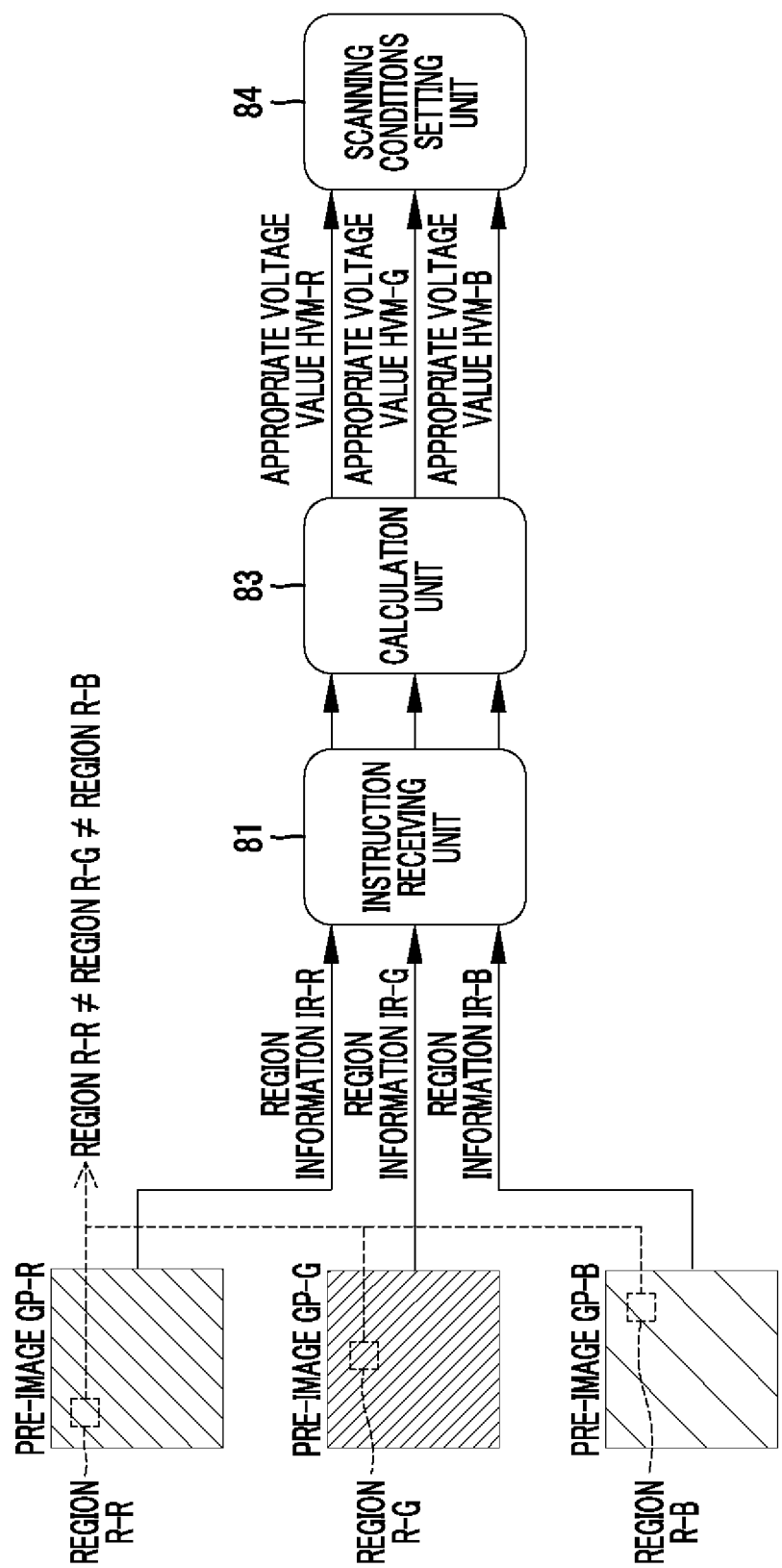
FIG. 14 is a diagram showing how the information of a different region for each of a plurality of pre-images is received and an appropriate voltage value for each of a plurality of regions is calculated.

In a case where a plurality of excitation light sources 26 are used in the main scanning, as shown in FIGS. 13 and 14, a region is designated for each of a plurality of pre-images. The instruction receiving unit 81 receives information of a region for each of the plurality of pre-images, and outputs the information to the calculation unit 83. The calculation unit 83 calculates an appropriate voltage value for each of a plurality of regions designated for each of the plurality of pre-images.

FIG. 13 illustrates a case in which common regions R-R, R-G, and R-B are designated for the pre-images GP-R, GP-G, and GP-B shown in FIG. 12. On the other hand, FIG. 14 illustrates a case in which different regions R-R, R-G, and R-B are designated for the pre-images GP-R, GP-G, and GP-B shown in FIG. 12. In this case, region information IR-R that is the information of the region R-R, region information IR-G that is the information of the region R-G, and region information IR-B that is the information of the region R-B are received by the instruction receiving unit 81, and are output to the calculation unit 83. Then, an appropriate voltage value HVM-R of the region R-R, an appropriate voltage value HVM-G of the region R-G, and an appropriate voltage value HVM-B of the region R-B are calculated by the calculation unit 83, and are output to the pre-scanning conditions setting unit 84. Cases of different regions include not only a case where there is no overlap between regions but also a case where there is a partial overlap between regions and a case where part or all of a certain region is included in another region.

FIGS. 15 to 24 show the screen 90 displayed on the display 17 by the display control unit 85.

The screen 90 is mainly configured to include a main display frame 91, a status display frame 92, and a legend display frame 93. An imaging menu, a set of the excitation light source 26 and the filter 45, a pre-image, a main image, the appropriate voltage value HVM, and the like are displayed in the main display frame 91. The status (operation state) of the image reading apparatus 11, such as the end of pre-scanning and the end of main scanning, is displayed in the status display frame 92. A legend used in the set of the excitation light source 26 and the filter 45 is displayed in the legend display frame 93. For example, a legend written with characters of "LB" in the circle shows the blue excitation light source 26C that emits blue excitation light having a center wavelength of 488 nm, and a legend written with characters of "FR" in the circle shows the red filter 45A that cuts light (red excitation light) having a wavelength of 635 nm or less and transmits light (red fluorescence) having a wavelength longer than 635 nm.

Figure 15:
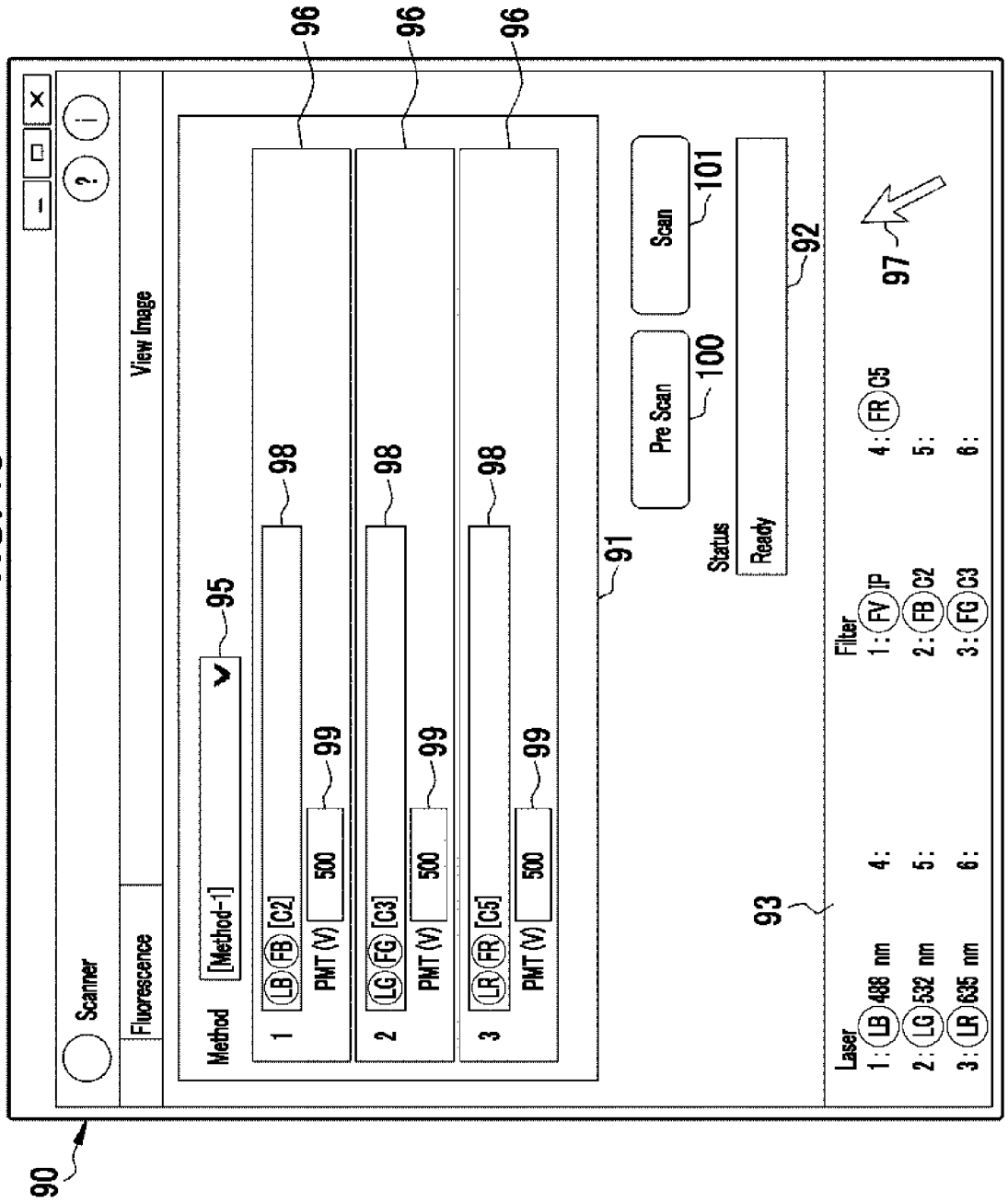
FIG. 15 is a diagram showing a screen displayed on a display before the start of scanning.

FIG. 15 is the screen 90 displayed on the display 17 before the start of scanning. A pull-down menu 95 for selecting an imaging menu and a set display frame 96 are provided in the main display frame 91. In the status display frame 92, it is displayed that the status of the image reading apparatus 11 is a preparation state before the start of scanning.

In the event that the pull-down menu 95 is selected with a cursor 97, selectable imaging menus are listed and displayed immediately below the pull-down menu 95. The user operates the pull-down menu 95 with the cursor 97 to select a desired imaging menu.

The set display frame 96 is displayed as many as the number of sets of the excitation light source 26 and the filter 45 used in scanning. In the set display frame 96, two small frames 98 and 99 are provided. In the small frame 98, a legend of the set of the excitation light source 26 and the filter 45 and a fluorescent dye or a fluorescent protein corresponding to the set are displayed. In the small frame 99, the default voltage value HVP of the pre-scanning conditions 76P is displayed.

In FIG. 15, "method-1" is selected as an imaging menu. The imaging menu "method-1" is the imaging menu 1 illustrated in FIG. 7 and the like. Therefore, three sets (R), (G), and (B) illustrated in FIG. 7 and the like are displayed in the set display frame 96. That is, a set (B) of the blue excitation light source 26C and the blue filter 45C of (a legend written with characters of "LB" in the circle, a legend written with characters of "FB" in the circle, and a corresponding fluorescent dye "C2") is displayed in the upper set display frame 96, a set (G) of the green excitation light source 26B and the green filter 45B (a legend written with characters of "LG" in the circle, a legend written with characters of "FG" in the circle, and a corresponding fluorescent dye "C3") is displayed in the middle set display frame 96, and a set (R) of the red excitation light source 26A and the red filter 45A (a legend written with characters of "LR" in the circle, a legend written with characters of "FR" in the circle, and a corresponding fluorescent dye "C5") is displayed in the lower set display frame 96.

A pre-scan start button 100 and a main scan start button 101 are provided below the main display frame 91. In a case where the pre-scan start button 100 is selected, the pre-scanning conditions 76P corresponding to the imaging menu (in the case of FIG. 15, imaging menu 1) selected in the pull-down menu 95 at that time are output to the image reading apparatus 11. Then, pre-scanning is performed by the image reading apparatus 11.

Figure 16:
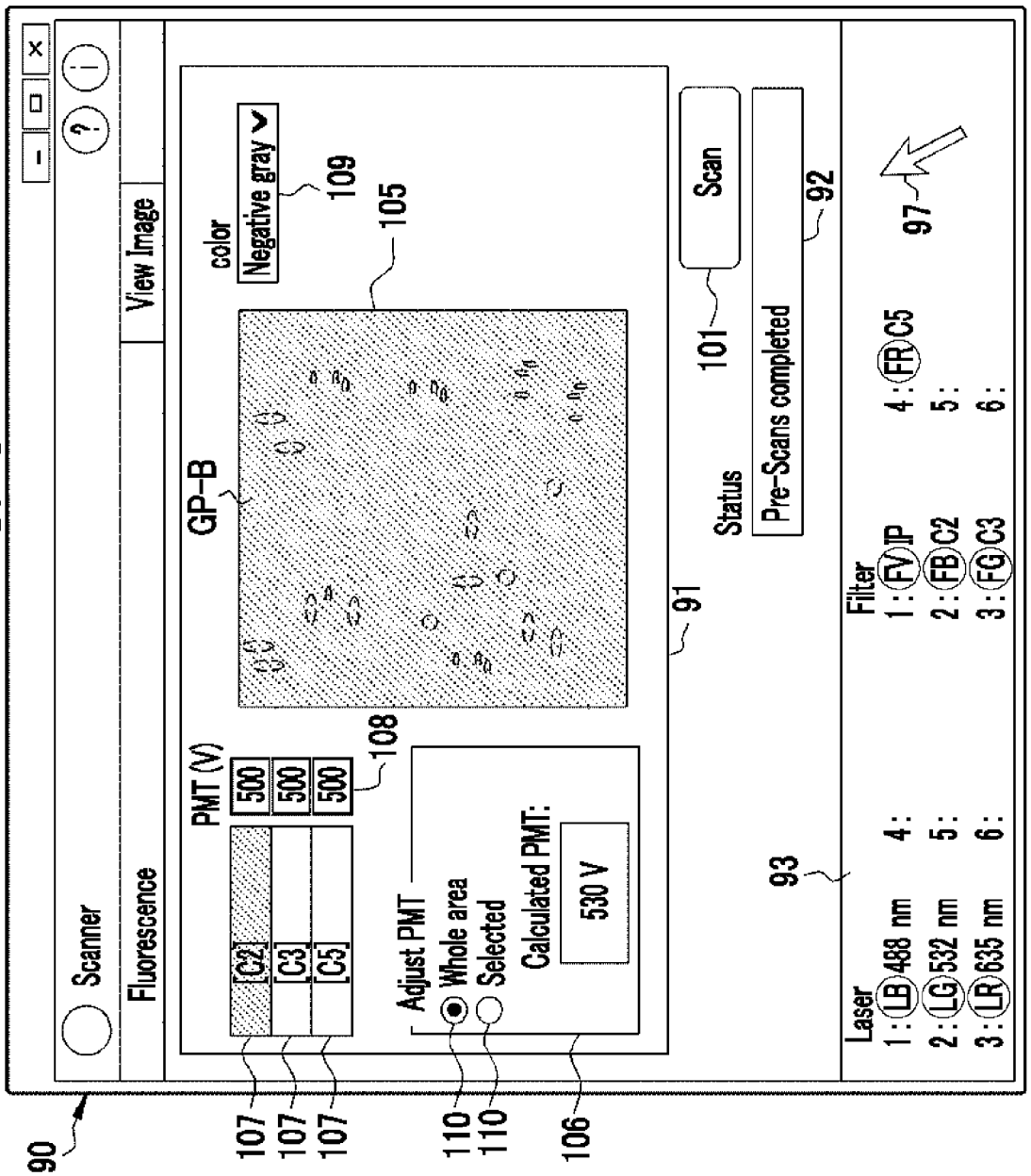
FIG. 16 is a diagram showing a screen displayed on a display after pre-scanning.

FIG. 16 is the screen 90 displayed on the display 17 after pre-scanning. An image display frame 105, an appropriate voltage value display frame 106, and the like are provided in the main display frame 91. In the status display frame 92, it is displayed that the pre-scanning has ended. In addition, the pre-scan start button 100 disappears, and only the main scan start button 101 is displayed.

A pre-image is displayed in the image display frame 105. In the example shown in FIG. 15, the excitation light sources 26A to 26C are used in the main scanning. Therefore, as described with reference to FIG. 12 and the like, pre-scanning is performed by each of the excitation light sources 26A to 26C, and the pre-images GP-R, GP-G, and GP-B corresponding to the excitation light sources 26A to 26C are output. In a case where a plurality of pre-images are output as described above, a display selection button 107 for selecting a pre-image to be displayed in the image display frame 105 is provided on the left side of the image display frame 105. FIG. 16 shows a state in which the upper display selection button 107 corresponding to the set (B) (fluorescent dye "C2") of the blue excitation light source 26C and the blue filter 45C is selected. Therefore, the pre-image GP-B illustrated in FIG. 12 and the like is displayed in the image display frame 105.

A small frame 108 is provided on the right side of the display selection button 107. Similarly to the small frame 99 shown in FIG. 15, in the small frame 108, the default voltage value HVP of the pre-scanning conditions 76P is displayed. On the right side of the image display frame 105, a pull-down menu 109 for changing the color of the image displayed on the image display frame 105 is provided. As options of the pull-down menu 109, negative gray, positive gray, red, green, blue, multicolor, and the like are prepared. In the case of negative gray, the image is a monochrome image in which a high density portion is expressed in black and a low density portion is expressed in white. In the case of positive gray, in contrast to the case of negative gray, the image is a monochrome image in which a low density portion is expressed in black and a high density portion is expressed in white.

In the appropriate voltage value display frame 106, the appropriate voltage value HVMall of the entire pre-image or the appropriate voltage value HVM of a region, such as "530 V" in the frame below "Calculated PMT:", is displayed. The appropriate voltage value display frame 106 is provided with A radio button 110 indicating whether the displayed appropriate voltage value is the appropriate voltage value HVMall of the entire pre-image or the appropriate voltage value HVM of a region is provided in the appropriate voltage value display frame 106. In a case where a black dot is displayed on the upper radio button 110, the displayed appropriate voltage value is the appropriate voltage value HVMall of the entire pre-image. In a case where a black dot is displayed on the lower radio button 110, the displayed appropriate voltage value is the appropriate voltage value HVM of a region. In FIG. 16, since a region has not been specified by the user, the displayed appropriate voltage value is the appropriate voltage value HVMall of the entire pre-image, and a black dot is displayed on the upper radio button 110.

Figure 17:
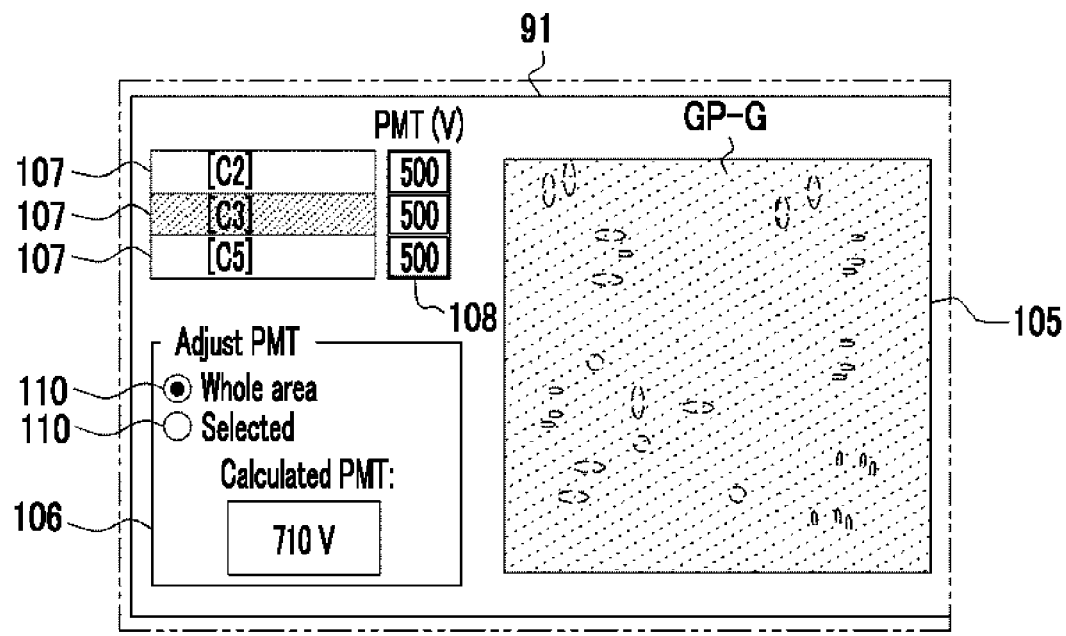
FIG. 17 is a diagram showing a part of the screen displayed on the display after pre-scanning.
Figure 18:
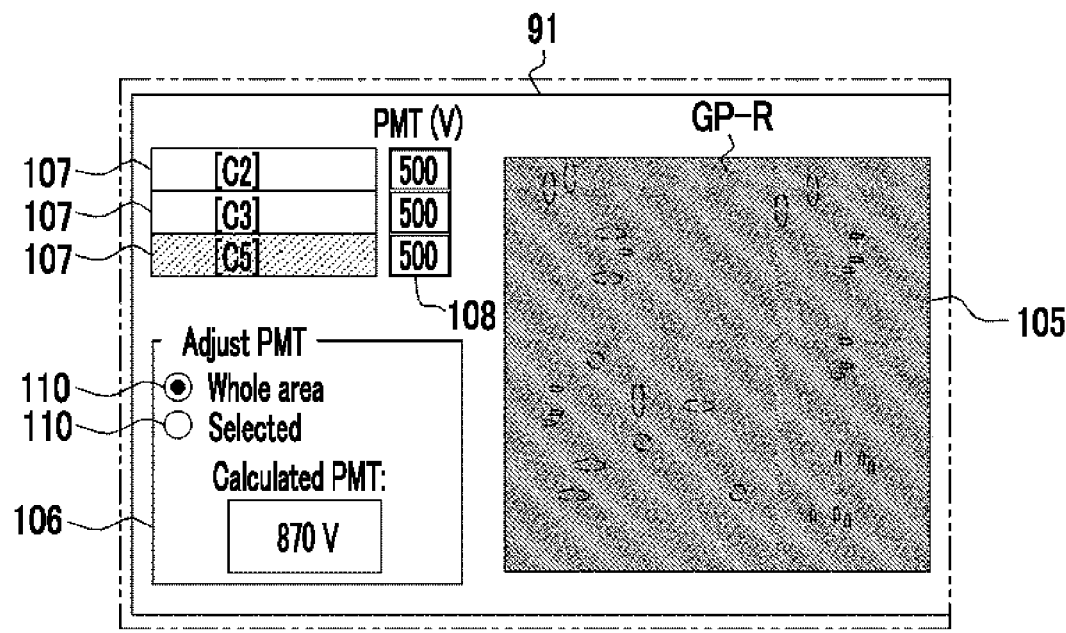
FIG. 18 is a diagram showing a part of the screen displayed on the display after pre-scanning.

As shown in FIG. 17, in a case where the middle display selection button 107 corresponding to the set (G) (fluorescent dye "C3") of the green excitation light source 26B and the green filter 45B is selected, the pre-image GP-G illustrated in FIG. 12 and the like is displayed in the image display frame 105. As shown in FIG. 18, in a case where the lower display selection button 107 corresponding to the set (R) (fluorescent dye "C5") of the red excitation light source 26A and the red filter 45A is selected, the pre-image GP-R illustrated in FIG. 12 and the like is displayed in the image display frame 105.

Figure 19:
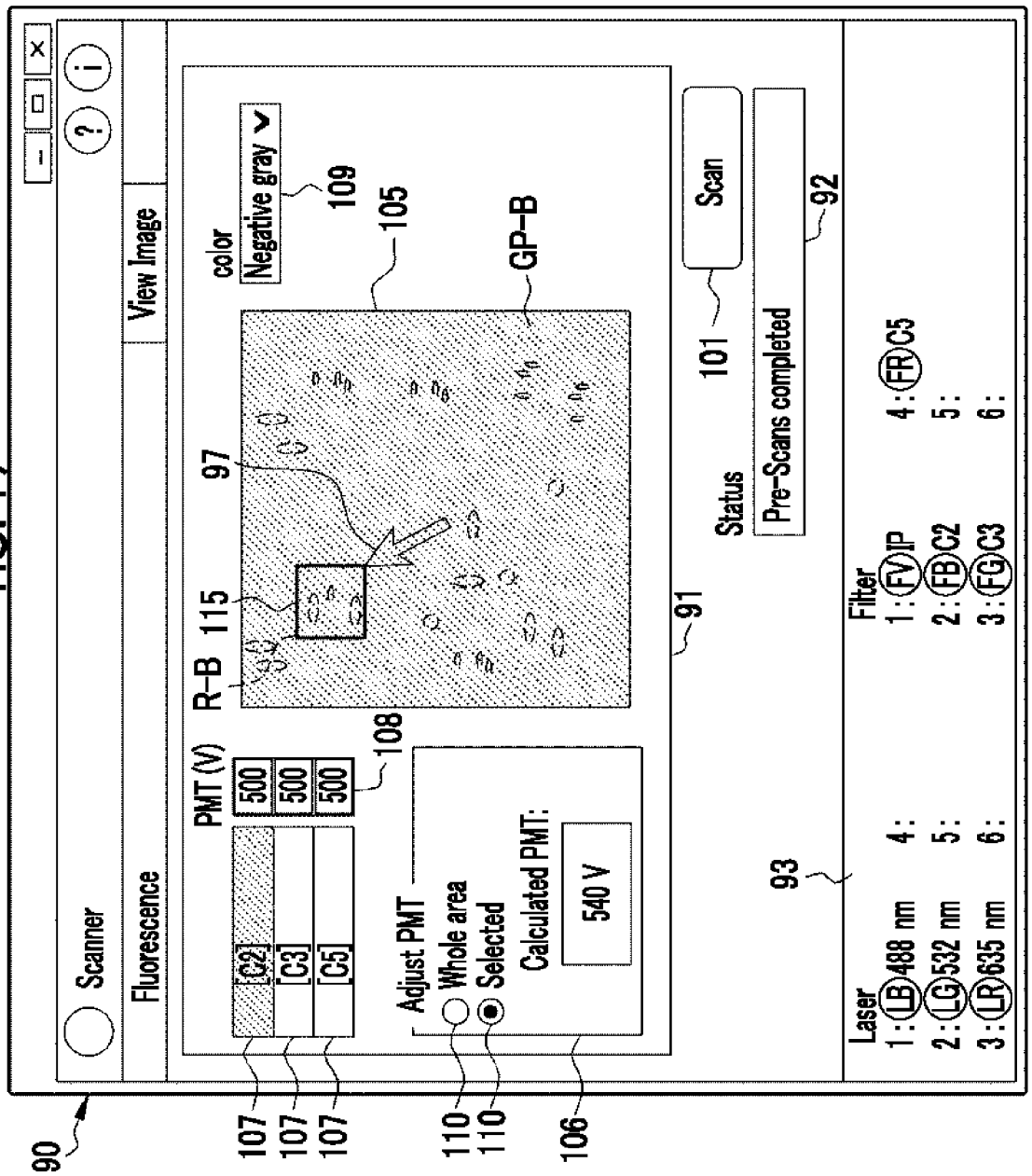
FIG. 19 is a diagram showing how a user designates a region.

FIG. 19 shows how the user designates region on the screen 90 shown in FIG. 16. In order to designate a region, for example, the user moves a cursor 97 to a desired point on the pre-image displayed on the image display frame 105, and right-clicks the mouse. Then, by moving the cursor 97 so that a desired region is covered by a rectangular region designation frame 115 appearing in the pre-image by the operation, the region is designated. The position of the region designation frame 115 on the pre-image and the width of the region designation frame 115 in the horizontal and vertical directions can be changed even after the region designation frame 115 is designated.

By designation of the region designation frame 115, region information is input to the instruction receiving unit 81. Then, the appropriate voltage value HVM of the region is calculated by the calculation unit 83. In the appropriate voltage value display frame 106, black dot display switching occurs in the lower radio button 110, and the appropriate voltage value HVM of the region is displayed instead of the appropriate voltage value HVMall of the entire pre-image.

In FIG. 19, a region designated by the region designation frame 115 is the region R-B shown in FIGS. 13 and 14, and region information received by the instruction receiving unit 81 is the region information IR-B shown in FIGS. 13 and 14. In addition, the appropriate voltage value HVM-B shown in FIGS. 13 and 14 is displayed in the appropriate voltage value display frame 106.

Figure 20:
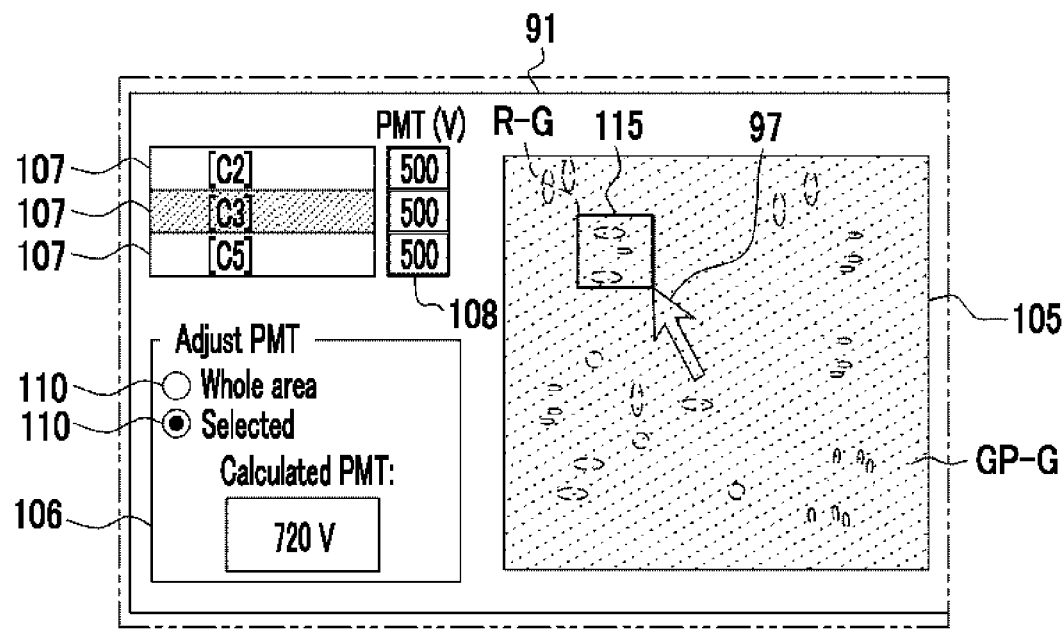
FIG. 20 is a diagram showing how a user designates a region.
Figure 21:
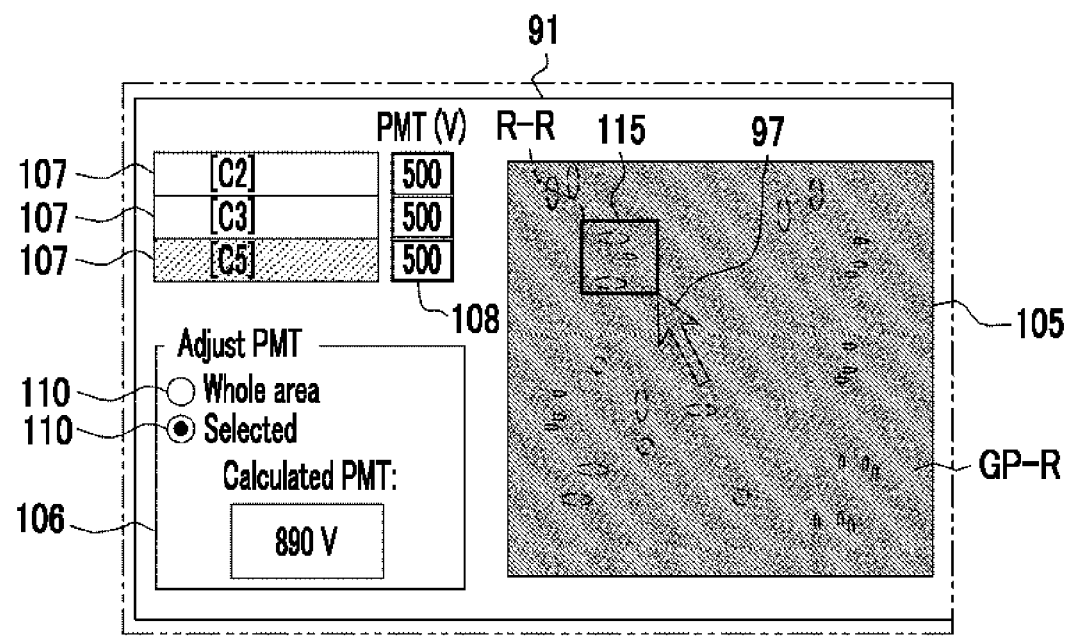
FIG. 21 is a diagram showing how a user designates a region.

As shown in FIGS. 20 and 21, the same region designation is also performed for the pre-image GP-G shown in FIG. 17 and the pre-image GP-R shown in FIG. 18, and the appropriate voltage values HVM-G and HVM-R are calculated and are displayed in the appropriate voltage value display frame 106. FIGS. 19 to 21 show examples in which common regions in the plurality of pre-images GP-B, GP-G, and GP-R are designated.

After the region designation, in a case where the main scan start button 101 is selected, the temporary scanning conditions 76M in which the appropriate voltage value HVM has been set by the scanning conditions setting unit 84 are output to the image reading apparatus 11 as the main scanning conditions. Then, the main scanning is performed by the image reading apparatus 11.

Figure 22:
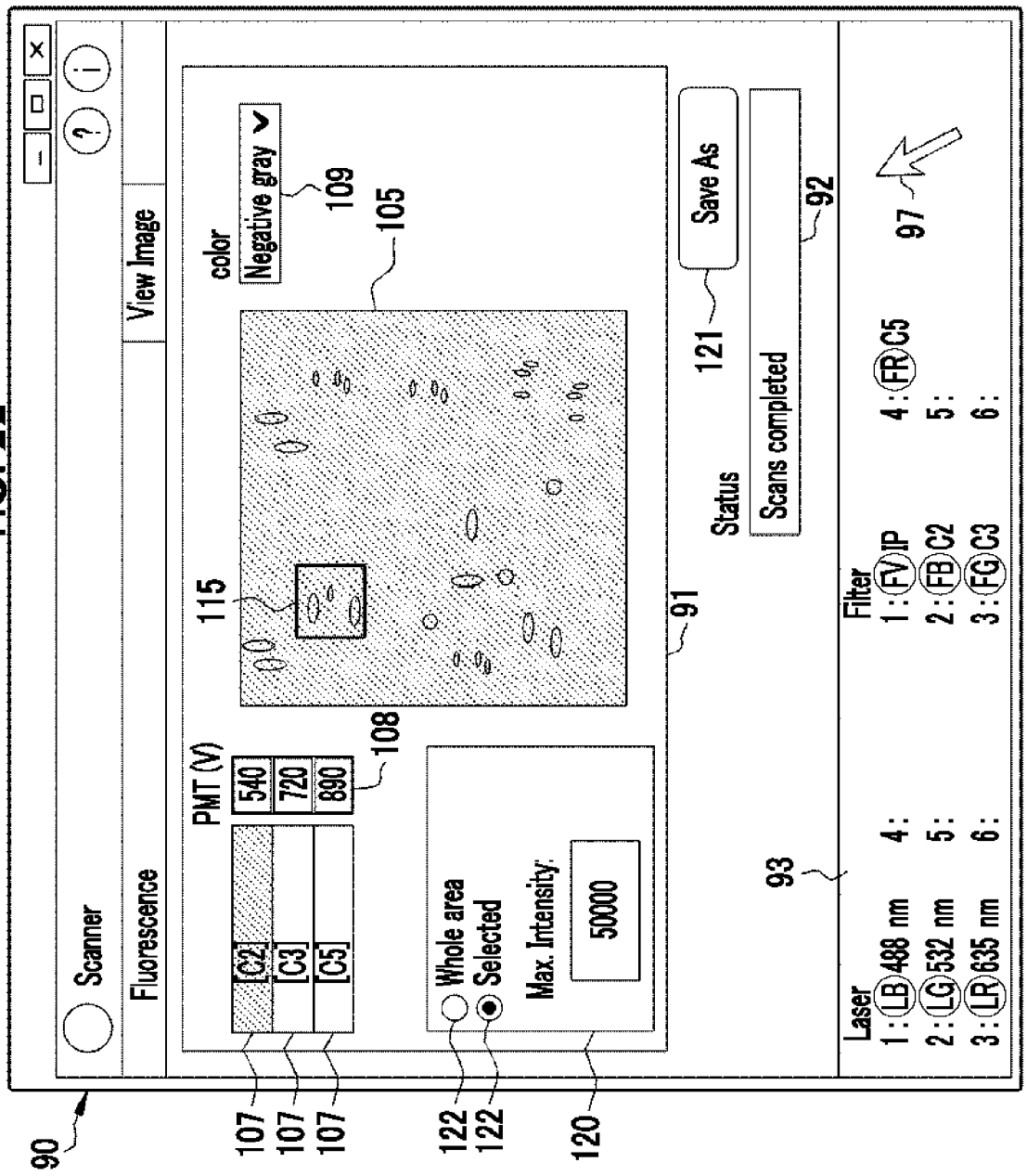
FIG. 22 is a diagram showing a screen displayed on the display after main scanning.

FIG. 22 shows the screen 90 displayed on the display 17 after the main scanning. The same things as on the screen 90 shown in FIG. 16 and the like are displayed in the main display frame 91 except that a representative density value display frame 120 is displayed instead of the appropriate voltage value display frame 106. However, in the image display frame 105, the main image is displayed instead of the pre-image, and the region designation frame 115 designated in FIG. 19 and the like is displayed. In the small frame 108, the appropriate voltage value HVM is displayed instead of the voltage value HVP of the pre-scanning conditions 76P.

In this case, in the status display frame 92, it is displayed that the main scanning has ended. Instead of the main scan start button 101, a save button 121 for storing the main image in the storage device 65 is displayed.

In the representative density value display frame 120, a representative value SMall of the density of the entire main image or a representative value SM of the density of the region of the main image, such as "50000" in the frame below "Max. Intensity:", is displayed. Similarly to the representative value SPall of the density of the entire pre-image and the representative value SP of the density of the region, the representative value SMall of the density of the entire main image and the representative value SM of the density of the region are derived by the calculation unit 83 and are output to the display control unit 85.

A radio button 122 for switching the representative value of the density to be displayed to either the representative value SMall of the density of the entire main image or the representative value SM of the density of the region is provided in the representative density value display frame 120. The representative value SMall of the density of the entire main image is displayed in a case where the upper radio button 122 is selected, and the representative value SM of the density of the region is displayed in a case where the lower radio button 122 is selected.

In FIG. 22, the lower radio button 122 is selected, and the representative value SM of the density of the region is displayed. Through the representative density value display frame 120, it is possible to check whether or not the density is an appropriate density ST for analysis.

FIG. 22 shows a state in which the upper display selection button 107 corresponding to the set (B) (fluorescent dye "C2") of the blue excitation light source 26C and the blue filter 45C of is selected. Accordingly, a main image obtained by performing main scanning with the set (B) of the blue excitation light source 26C and the blue filter 45C is displayed in the image display frame 105.

A plurality of display selection buttons 107 can be selected. Therefore, for example, as shown on the screen 90 in FIG. 23, it is possible to select all of the display selection buttons 107 so that a superimposed image of three main images obtained by main scanning using the three sets (R), (G), and (B) is displayed in the image display frame 105.

Figure 23:
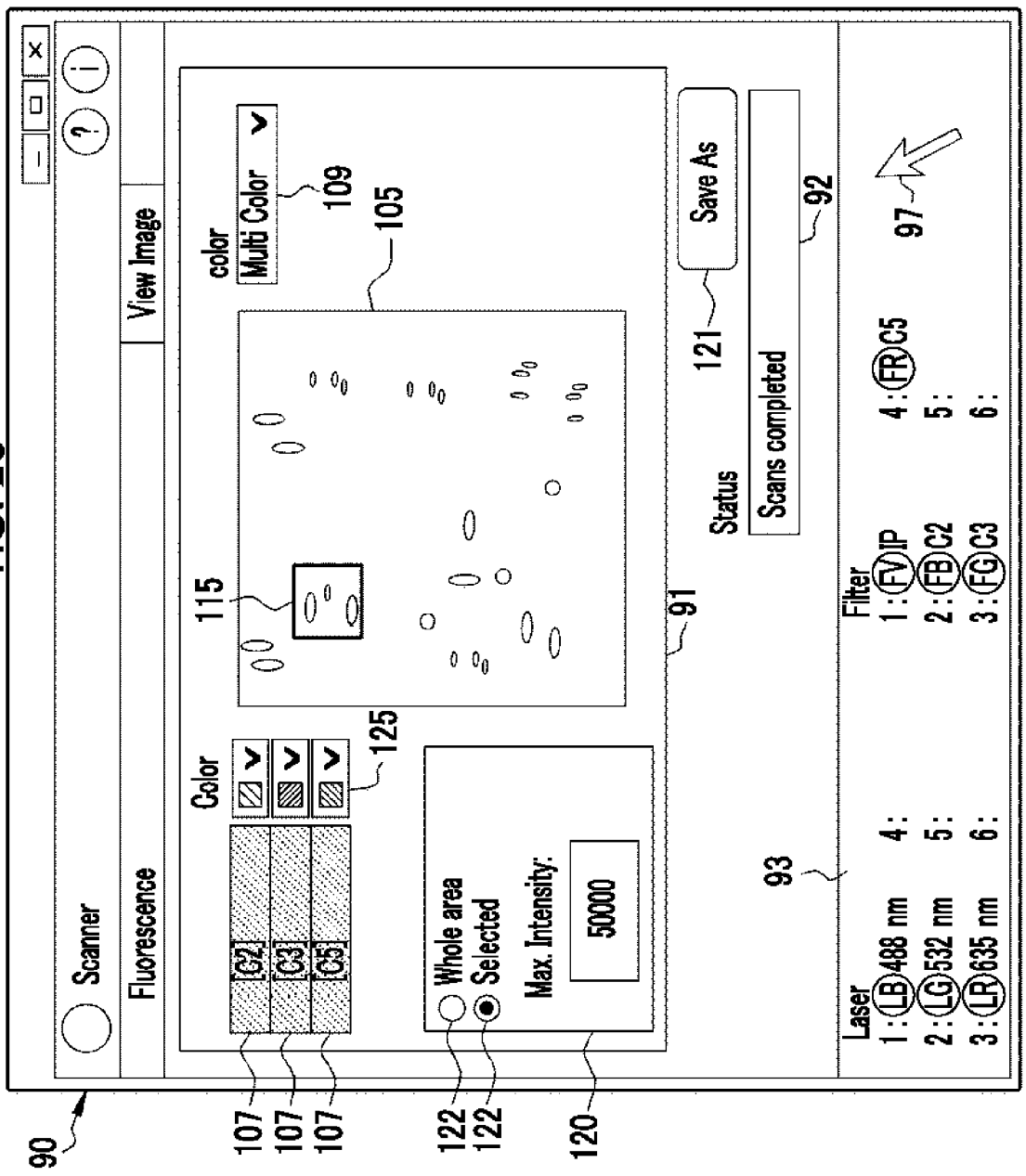
FIG. 23 is a diagram showing a screen on which a superimposed image of main images is displayed.

In FIG. 23, multi-color is selected in the pull-down menu 109. On the right side of the display selection button 107, a pull-down menu 125 for color assignment is provided instead of the small frame 108. For example, blue is assigned to the set (B) of the blue excitation light source 26C and the blue filter 45C, green is assigned to the set (G) of the green excitation light source 26B and the green filter 45B, and red is assigned to the set (R) of the red excitation light source 26A and the red filter 45A.

Figure 24:
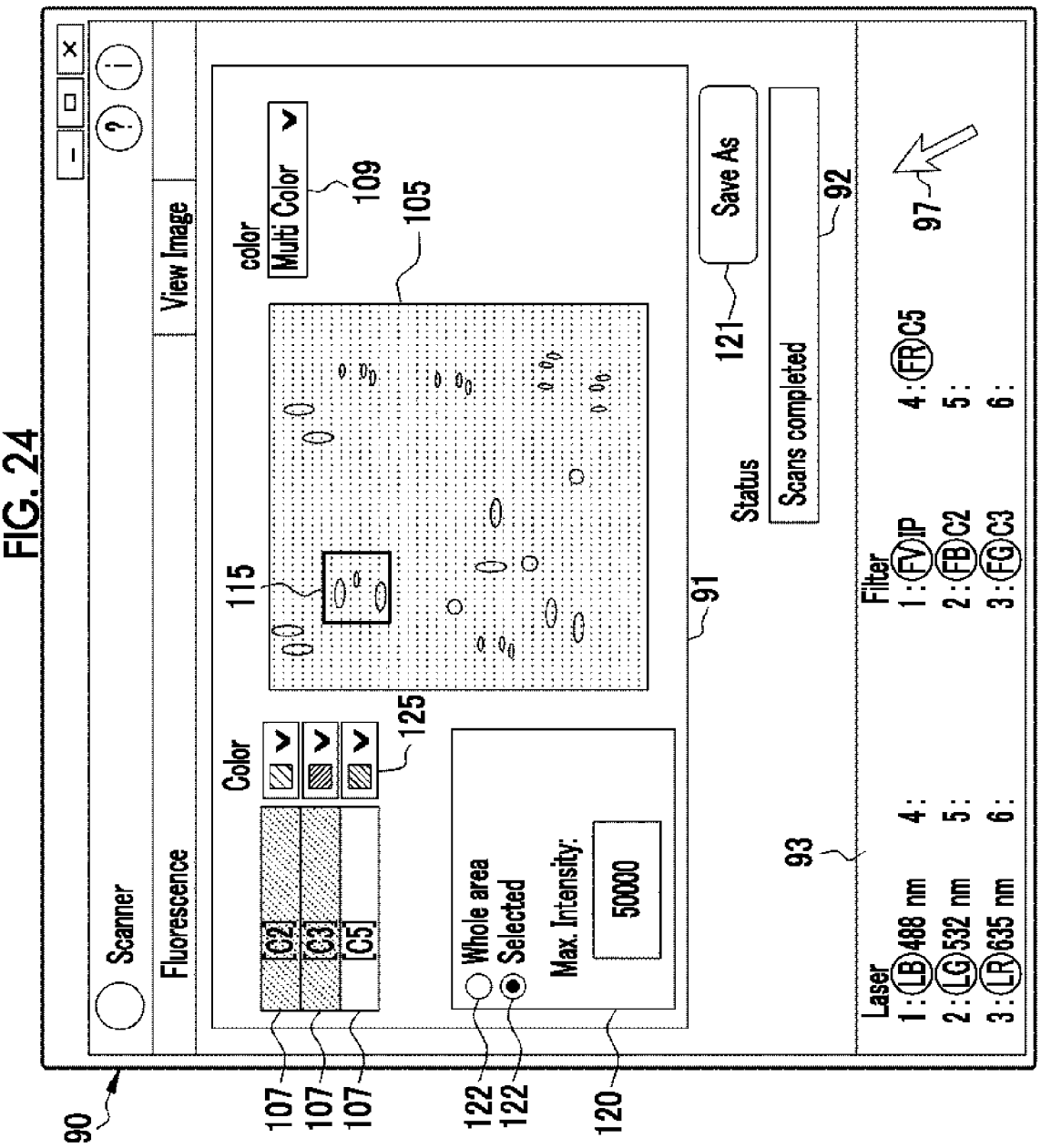
FIG. 24 is a diagram showing a screen on which a superimposed image of main images is displayed.

Alternatively, as shown on the screen 90 in FIG. 24, it is also possible to select two display selection buttons 107 so that a superimposed image of two main images (in this case, main image obtained by the sets (B) and (G)), among three images obtained by main scanning using the three sets (R), (G), and (B), is displayed in the image display frame 105. In this manner, since one main image can be displayed independently and a superimposed image of a plurality of main images can be displayed, it is possible to check the appearance of each main image from various viewpoints. In addition, simple analysis can be completed before full-scale analysis using a dedicated analyzer.

Figure 25:
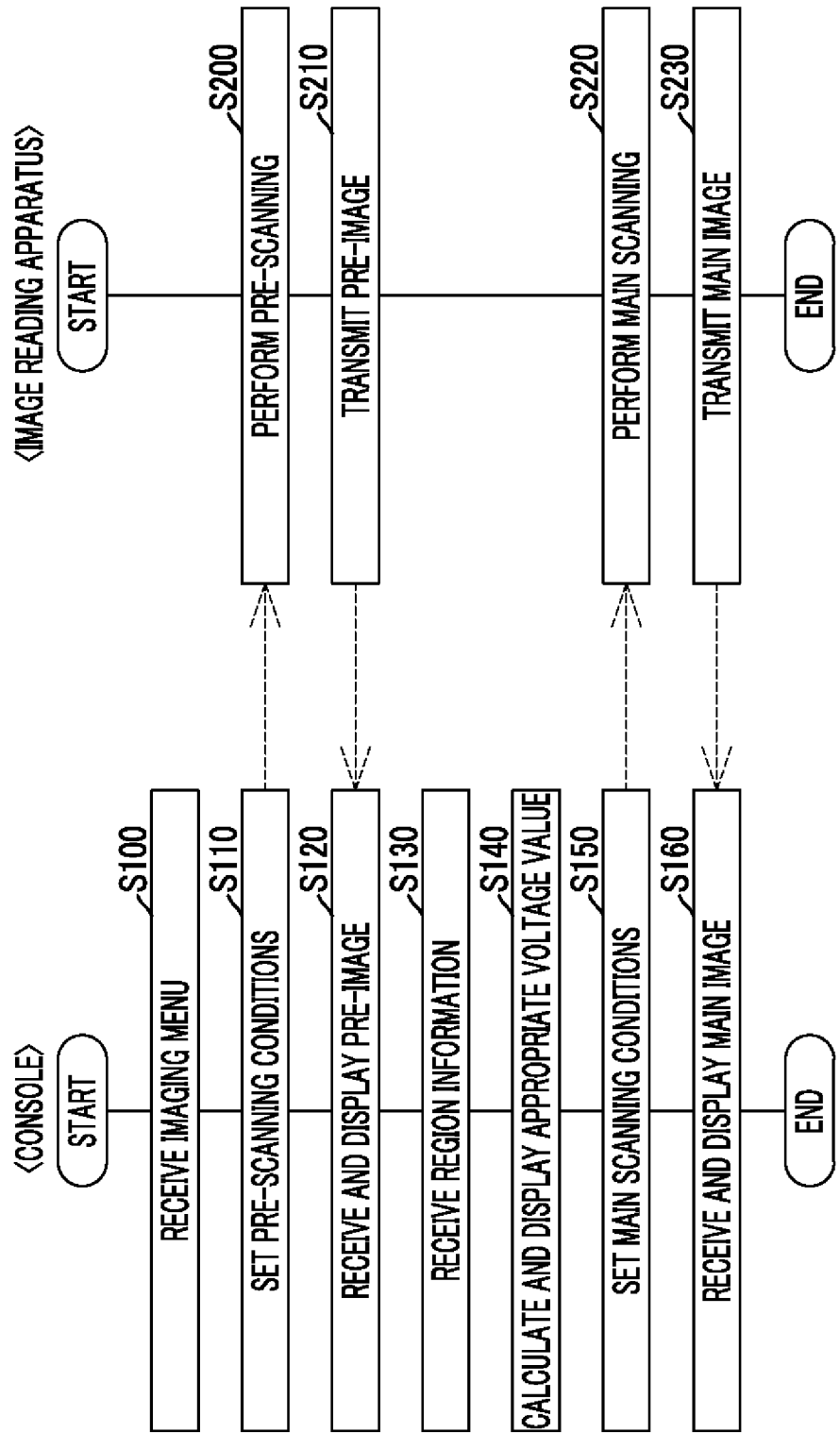
FIG. 25 is a flowchart showing the procedure of the process of the image detection system.

The operation of the above configuration will be described with reference to a flowchart shown in FIG. 25. First, the user performs preparatory work, such as setting the image carrier 13 on the stage 25. After finishing the preparatory work, the user selects a desired imaging menu in the pull-down menu 95 on the screen 90 shown in FIG. 15, and selects the pre-scan start button 100. As a result, the imaging menu is received by the instruction receiving unit 81 (step S100). Then, in the flow shown in FIG. 10, the pre-scanning conditions 76P corresponding to the imaging menu are set by the scanning conditions setting unit 84 (step S110, scanning conditions setting step). The set pre-scanning conditions 76P are output to the image reading apparatus 11.

In the pre-scanning conditions 76P, the resolution of the pre-image lower than the resolution of the main image and image processing simpler than image processing performed on the main image are set. Therefore, it is possible to finish pre-scanning, which does not directly contribute to analysis, in a short time. At least one of the resolution of the pre-image lower than the resolution of the main image or the image processing simpler than the image processing performed on the main image may be set in the pre-scanning conditions 76P.

The image reading apparatus 11 performs pre-scanning based on the pre-scanning conditions 76P from the console 12 (step S200). In a case where a plurality of excitation light sources 26 are used in the main scanning, pre-scanning is performed by each of the plurality of excitation light sources 26. The pre-image generated by pre-scanning is transmitted to the console 12 (step S210).

In the console 12, the pre-image from the image reading apparatus 11 is received by the image receiving unit 80, and is displayed on the display 17 by the display control unit 85 as shown on the screen 90 in FIG. 16 (step S120, image receiving step). In a case where a plurality of excitation light sources 26 are used in the main scanning, a plurality of pre-images corresponding to the plurality of excitation light sources 26 are received.

Then, as shown on the screen 90 in FIG. 19, a region in the pre-image is designated by the user. As a result, region information is received by the instruction receiving unit 81 (step S130, region information receiving step). In a case where a plurality of excitation light sources 26 are used in the main scanning, region information regarding each of the plurality of pre-images is received.

Then, in the flow shown in FIG. 11, the appropriate voltage value HVM is calculated by the calculation unit 83, and the calculated appropriate voltage value HVM is displayed on the display 17 by the display control unit 85 (step S140, calculation step). Then, main scanning conditions including the appropriate voltage value HVM are set by the scanning conditions setting unit (step S150, scanning conditions setting step). The set scanning conditions are output to the image reading apparatus 11. In a case where a plurality of excitation light sources 26 are used in the main scanning, the appropriate voltage value HVM for each of the plurality of pre-images designated for each of the plurality of pre-images is calculated.

In the image reading apparatus 11, main scanning is performed based on the main scanning conditions from the console 12 (step S220). Similarly to the pre-scanning, the main scanning is performed by each of the plurality of excitation light sources 26. The main image generated by the main scanning is transmitted to the console 12 (step S230).

In the console 12, the main image from the image reading apparatus 11 is received by the image receiving unit 80, and is displayed on the display 17 by the display control unit 85 as shown on the screen 90 in FIG. 22 (step S160). Thus, one scanning according to one imaging menu ends.

Since the appropriate voltage value HVM of the photomultiplier 31 that becomes the appropriate density ST for analysis is calculated and the main scanning is performed using the calculated appropriate voltage value HVM, the user does not have to determine the voltage value of the photomultiplier 31 by trial and error. Therefore, the main image in which a region that the user desires has the appropriate density ST for analysis can be output quickly and easily from the image reading apparatus 11.

In a case where a plurality of excitation light sources 26 are used in the main scanning, pre-scanning is performed by each of the plurality of excitation light sources 26, a plurality of pre-images corresponding to the plurality of excitation light sources 26 and region information regarding each of the plurality of pre-images are received, and the appropriate voltage value HVM for each of a plurality of regions designated for each of the plurality of pre-images is calculated. Therefore, since the main scanning of each of the plurality of excitation light sources 26 can be performed with the appropriate voltage value HVM, each region that the user desires in all of the plurality of main images obtained by the main scanning can also have the appropriate density ST for analysis. As a result, it is possible to smoothly proceed to analysis using a plurality of main images, and it is possible to improve the accuracy of the analysis result.

As regions, common regions in a plurality of pre-images may be designated as shown in FIG. 13, or different regions may be designated as shown in FIG. 14. Therefore, it is possible to cope with both a case of performing observation focusing on common regions in a plurality of main images, such as a case of identifying a protein expressed in relation to a specific disease, and a case in which it is necessary to have uniform densities of different regions, such as a case of using the image carrier 13 in which an index for each set is set for different regions.

In the case of designating common regions in a plurality of pre-images, a region designated in one pre-image may be automatically applied to other pre-images instead of designating a region for each of the plurality of pre-images.

Since the appropriate voltage value HVM is calculated by calculation equation (1) having the variable α relevant to the set of the excitation light source 26 and the filter 45 to be used and the resolution of the pre-image and the resolution of the main image, the relationship between the voltage value of the photomultiplier 31 and the image density that is originally different depending on the set of the excitation light source 26 and the filter 45 and the resolution of the pre-image and the resolution of the main image can be made constant regardless of the set of the excitation light source 26 and the filter 45 and the resolution of the pre-image and the resolution of the main image. Therefore, it is possible to improve the calculation accuracy of the appropriate voltage value HVM.

Since the pre-image, the main image, and the appropriate voltage value HVM are displayed for the viewing of the user, the user can proceed with the work while checking these.

Although the case where a plurality of excitation light sources 26 are used in the main scanning has been described, the basic flow of processing is also the same as in a case where the one excitation light source 26 is used in the main scanning. That is, pre-scanning is performed by one excitation light source 26, one pre-image corresponding to the one excitation light source 26 and its region information are received, and the appropriate voltage value HVM of one region designated in one pre-image is calculated. Also in this case, it is possible to obtain the effect that the main image, in which a region that the user desires has the appropriate density ST for analysis, can be output quickly and easily from the image reading apparatus 11.

Second Embodiment

In calculation equation (1) for calculating the appropriate voltage value HVM, the representative value SP of the density of the region is included as a variable. That is, the appropriate voltage value HVM is calculated based on the representative value SP of the density of the region. Therefore, the calculation accuracy of the appropriate voltage value HVM depends on the reliability of the representative value SP of the density of the region. Therefore, in the second embodiment shown in FIGS. 26 to 28, in order to improve the reliability of the representative value SP of the density of the region, pre-scanning is performed to designate a region. Then, second pre-scanning conditions different from the pre-scanning conditions 76P are set for the region and second pre-scanning is performed by the image reading apparatus 11, and the appropriate voltage value HVM is calculated based on the image of the region output in the second pre-scanning.

Figure 26:
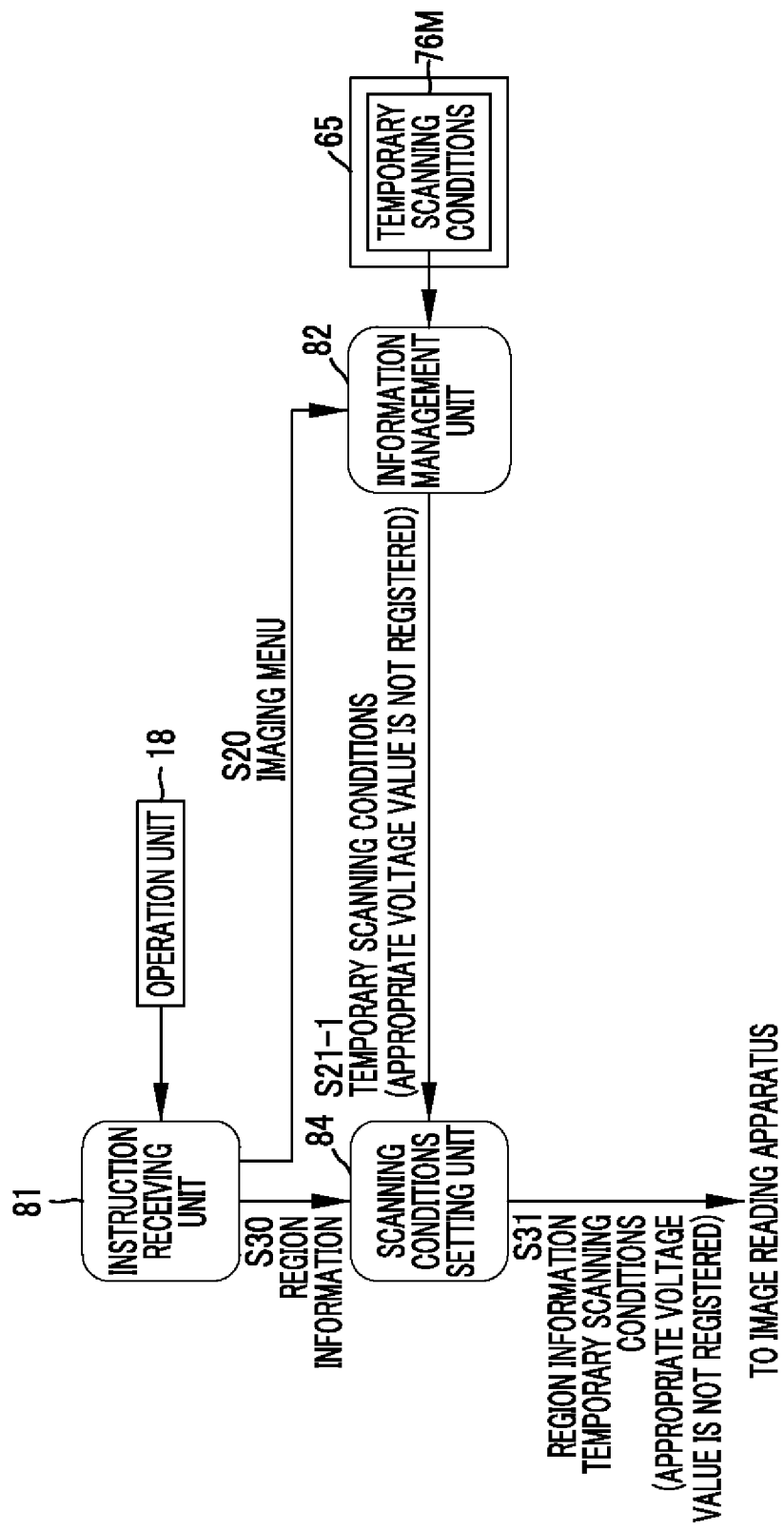
FIG. 26 is a diagram showing a flow in the case of setting the second pre-scanning conditions in a region and performing the second pre-scanning.

In the second embodiment, as shown in FIG. 26, the instruction receiving unit 81 outputs the region information to the scanning conditions setting unit 84 (step S30). In the flow of steps S20 and S21-1 shown in FIG. 11, the temporary scanning conditions 76M corresponding to the imaging menu are passed to the scanning conditions setting unit 84 from the information management unit 82. The scanning conditions setting unit 84 outputs the region information from the instruction receiving unit 81 and the temporary scanning conditions 76M from the information management unit 82 to the image reading apparatus 11 (step S31).

The image reading apparatus 11 controls the scanning unit 59 to perform the second pre-scanning on the region indicated by the region information with the temporary scanning conditions 76M. However, since the voltage value of the photomultiplier 31 is not registered in the temporary scanning conditions 76M, the default voltage value HVP of the pre-scanning conditions 76P is used. That is, in this example, in the second pre-scanning conditions, the items of the set of the excitation light source 26 and the filter 45, resolution, and image processing are the same as those in the temporary scanning conditions 76M, and the default voltage value HVP of the pre-scanning conditions 76P is applied to the temporary scanning conditions 76M. In addition, the same resolution as the resolution of the main image of the main scanning conditions and the same image processing as the image processing performed on the main image are set. As a result, since the reading interval of the pre-scanning conditions 76P is long, it is also possible to solve the problem that the image information of an important portion may not be able to be obtained or the image information may not be correct.

The image reading apparatus 11 transmits an image of a region (region image) GP2 (refer to FIG. 27) obtained by the second pre-scanning to the console 12.

Figure 27:
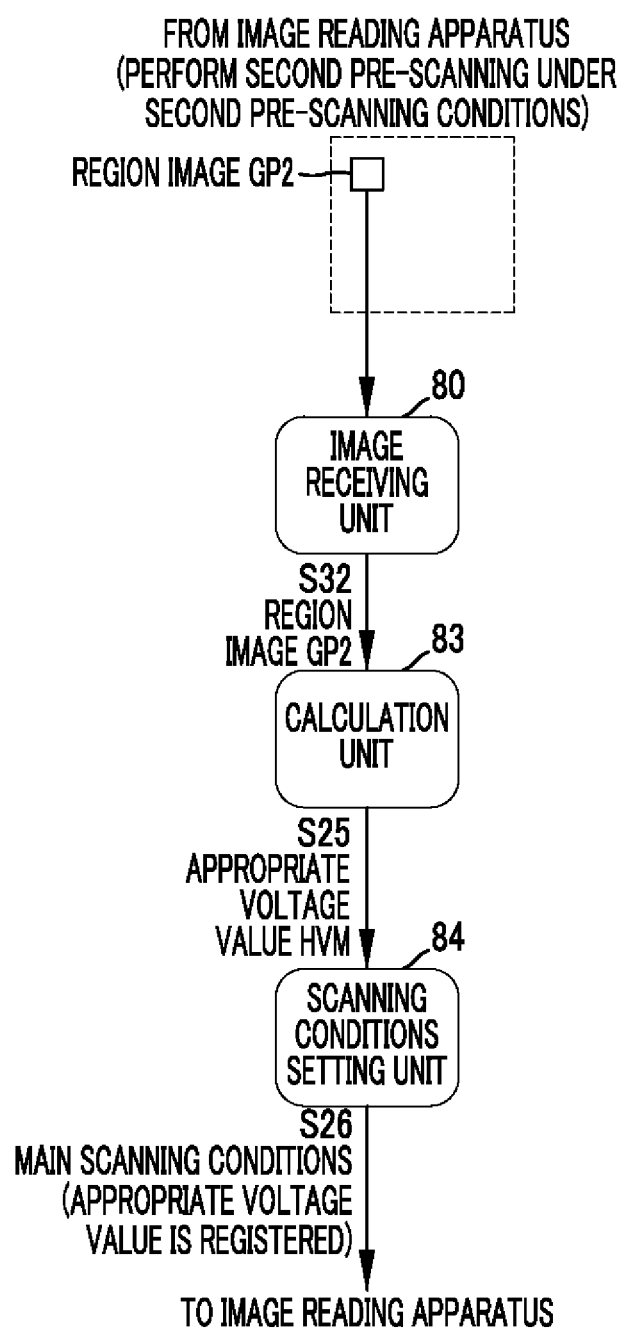
FIG. 27 is a diagram showing a flow of calculating an appropriate voltage value based on an image of a region output in the second pre-scanning.

In FIG. 27, the image receiving unit 80 receives the region image GP2 from the image reading apparatus 11, and outputs the region image GP2 to the calculation unit 83 (step S32). The calculation unit 83 derives the representative value SP of the density of the region from the region image GP2, and calculates the appropriate voltage value HVM based on the representative value SP. Since the subsequent processing is the same as in the case shown in FIG. 11, the explanation thereof will be omitted. In FIGS. 26 and 27, portions not related to the description are not shown in the same manner as in FIG. 10 and the like.

Figure 28:
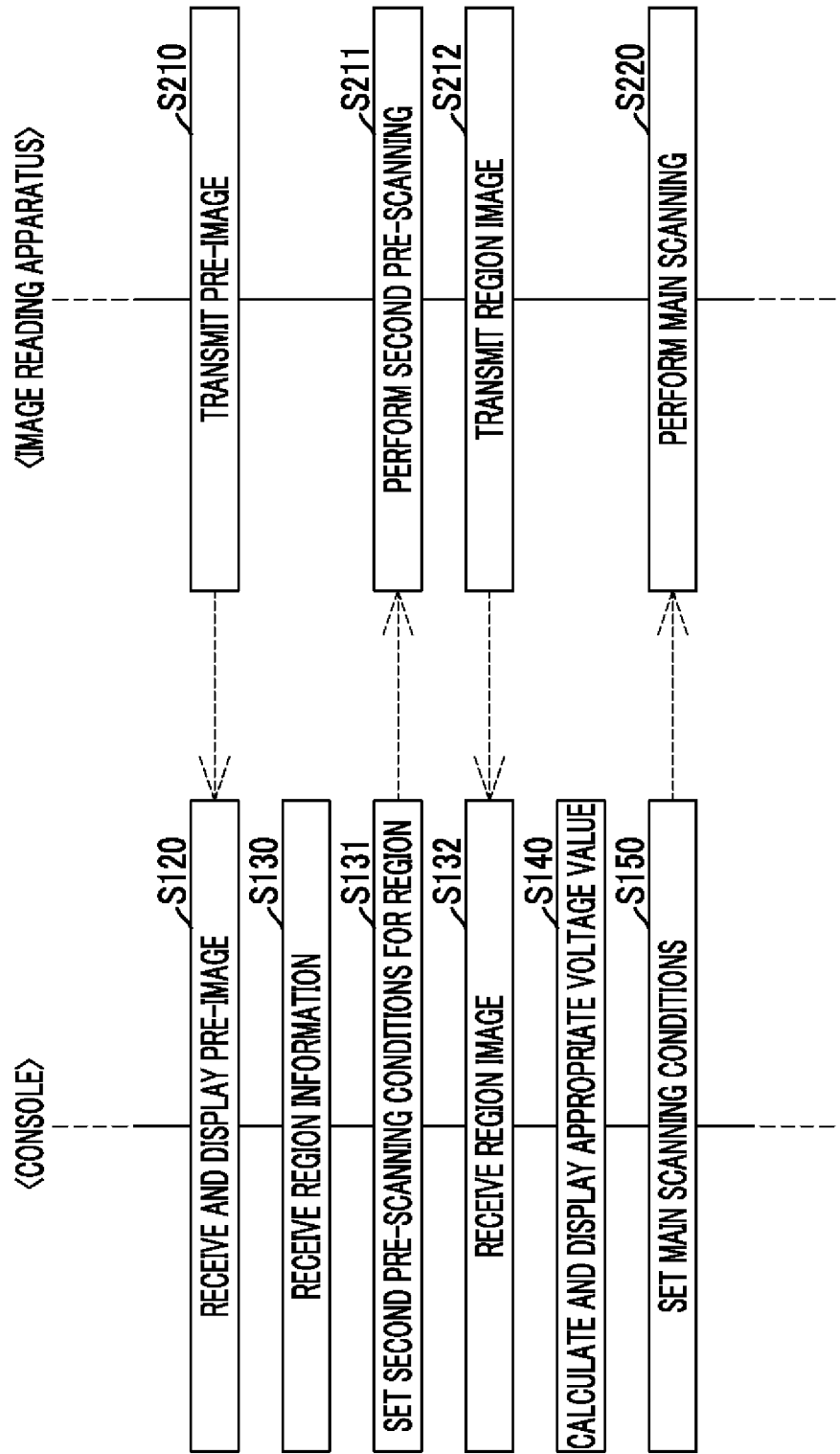
FIG. 28 is a flowchart showing the procedure of the process of an image detection system according to a second embodiment.

FIG. 28 is a flowchart showing a part of the procedure of the process of an image detection system according to the second embodiment. The same steps as in the flowchart shown in FIG. 25 of the first embodiment are denoted by the same reference numerals. Hereinafter, differences from the first embodiment will be mainly described.

After the region information is received by the instruction receiving unit 81 in step S130, the scanning conditions setting unit 84 sets the second pre-scanning conditions for the region (step S131). In the image reading apparatus 11, the second pre-scanning is performed on the region under the second pre-scanning conditions from the scanning conditions setting unit 84 (step S211). The region image GP2 generated by the second pre-scanning is transmitted to the console 12 (step S212).

In the console 12, the image receiving unit 80 receives the region image GP2 from the image reading apparatus 11 (step S132). The region image GP2 is output to the calculation unit 83 from the image receiving unit 80. The calculation unit 83 calculates the appropriate voltage value HVM based on the region image GP2 (step S140).

Thus, the second pre-scanning is performed by setting the second pre-scanning conditions, which include the same resolution as the resolution of the main image of the main scanning conditions and the same image processing as the image processing performed on the main image, for the region, and the appropriate voltage value HVM is calculated based on the region image GP2 output in the second pre-scanning. Therefore, it is possible to improve the reliability of the representative value SP of the density of the region more than in the case of the simple pre-scanning conditions 76P and to improve the calculation accuracy of the appropriate voltage value HVM.

In the second pre-scanning conditions, the same resolution as the resolution of the main image of the main scanning conditions and the same image processing as the image processing performed on the main image do not necessarily need to be set. At least one of the resolution or the image processing may be the same as that in the main scanning conditions. It is preferable to improve the reliability of the representative value SP of the density of the region, for example, by setting the resolution to be higher than that in the pre-scanning conditions 76P.

In the same manner as a pre-image and the like, a region image may also be displayed on the display 17. In addition, by setting the second pre-scanning conditions for a region and setting the pre-scanning conditions 76P for regions other than the region, the image reading apparatus 11 may be made to perform the second pre-scanning. Alternatively, an instruction button for making the image reading apparatus 11 perform the second pre-scanning may be provided on the screen 90, so that the image reading apparatus 11 performs the second pre-scanning only in a case where the instruction button is selected instead of making the image reading apparatus 11 automatically perform the second pre-scanning after region designation.

Third Embodiment

In each of the embodiments described above, the voltage value of the main scanning conditions is automatically set as the appropriate voltage value HVM by the scanning conditions setting unit 84. However, the user may desire to set the voltage value of the main scanning conditions manually. Therefore, in a third embodiment shown in FIGS. 29 to 31, an automatic setting mode for automatically setting the voltage value of the main scanning conditions as the appropriate voltage value HVM and a manual setting mode for setting the voltage value of the main scanning conditions by the user are switched.

Figure 29:
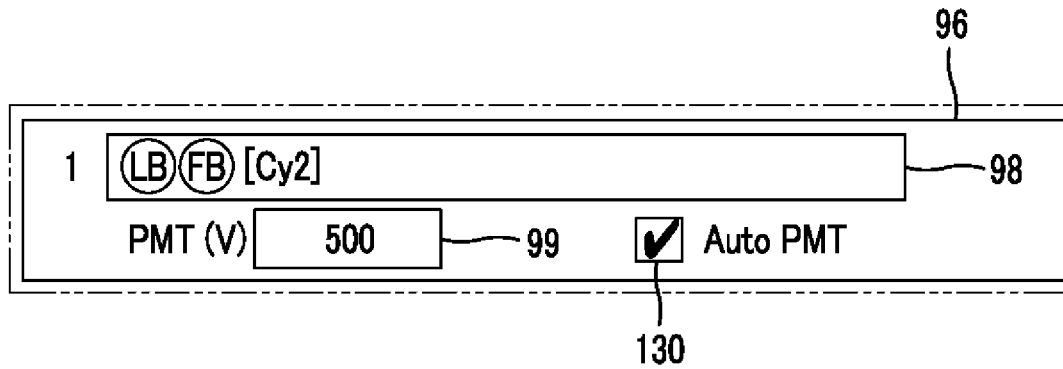
FIG. 29 is a diagram showing a set display frame in which a check box for mode switching is provided.

In the third embodiment, as shown in FIG. 29, a check box 130 for switching between the automatic setting mode and the manual setting mode is provided in the set display frame 96 displayed while selecting an imaging menu, for example. As shown in FIG. 29, a state in which the check box 130 is checked (check ON) is the automatic setting mode, and a state in which the check box 130 is not checked (check OFF) is the manual setting mode. In the third embodiment, the small frame 108 on the screen 90 shown in FIG. 19 and the like displayed after pre-scanning is used as an input box for the user to set the voltage value of the main scanning conditions.

Figure 30:
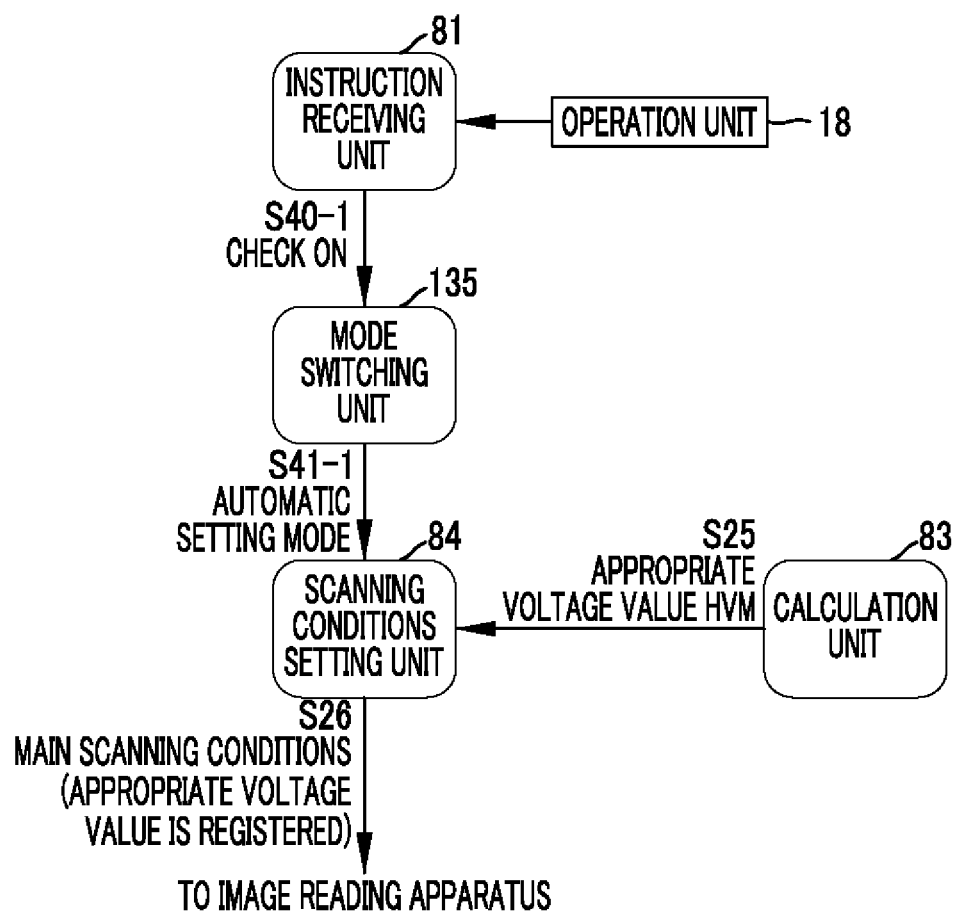
FIG. 30 is a diagram showing a flow in the case of an automatic setting mode.
Figure 31:
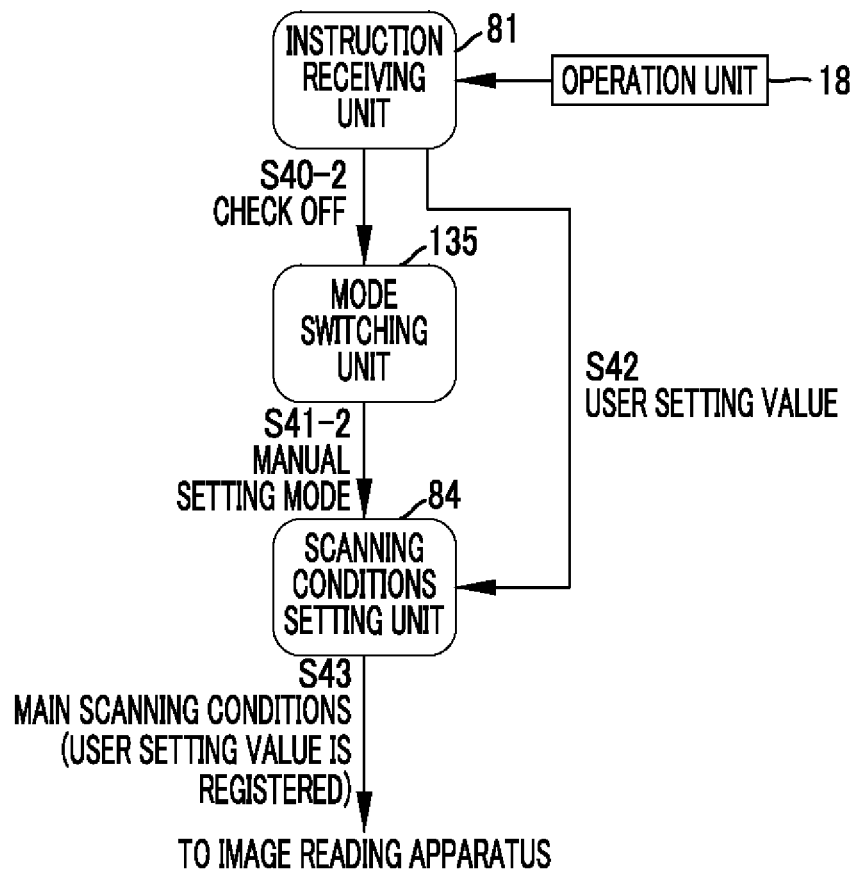
FIG. 31 is a diagram showing a flow in the case of a manual setting mode.

As shown in FIGS. 30 and 31, in the third embodiment, a mode switching unit 135 is provided between the instruction receiving unit 81 and the scanning conditions setting unit 84. The mode switching unit 135 switches the setting mode of the voltage value of the main scanning conditions between the automatic setting mode and the manual setting mode according to the input state (check ON or check OFF) of the check box 130 from the instruction receiving unit 81.

FIG. 30 shows the flow in the case of the automatic setting mode. In a case where the check box 130 is checked, the instruction receiving unit 81 outputs a notification of check ON to the mode switching unit 135 (step S40-1). The mode switching unit 135 sets the setting mode of the voltage value of the main scanning conditions to the automatic setting mode, and outputs a notification of the setting of the automatic setting mode to the scanning conditions setting unit 84 (step S41-1). In this case, in the same manner as in each of the embodiments described above, the scanning conditions setting unit 84 registers the appropriate voltage value HVM from the calculation unit 83 in the item of the voltage value of the photomultiplier 31 of the temporary scanning conditions 76M from the information management unit 82. The main scanning conditions in which the appropriate voltage value HVM is registered are output to the image reading apparatus 11 (step S26).

On the other hand, as shown in FIG. 31, in a case where the check box 130 is not checked and a notification of the setting of check OFF is received from the instruction receiving unit 81 (step S40-2), the mode switching unit 135 sets the setting mode of the voltage value of the main scanning conditions to the manual setting mode, and outputs a notification of the setting of the manual setting mode to the scanning conditions setting unit 84 (step S41-2). In this case, the scanning conditions setting unit 84 receives the user setting value, which has been input through the small frame 108, from the instruction receiving unit 81 (step S42). Then, instead of the appropriate voltage value HVM, the user setting value is registered in the item of the voltage value of the photomultiplier 31 of the temporary scanning conditions 76M from the information management unit 82. The main scanning conditions in which the user setting value is registered are output to the image reading apparatus 11 (step S43).

Thus, since it is possible to switch between the automatic setting mode and the manual setting mode, it is possible to respond to the user's desire to manually set the voltage value of the main scanning conditions.

Figure 32:
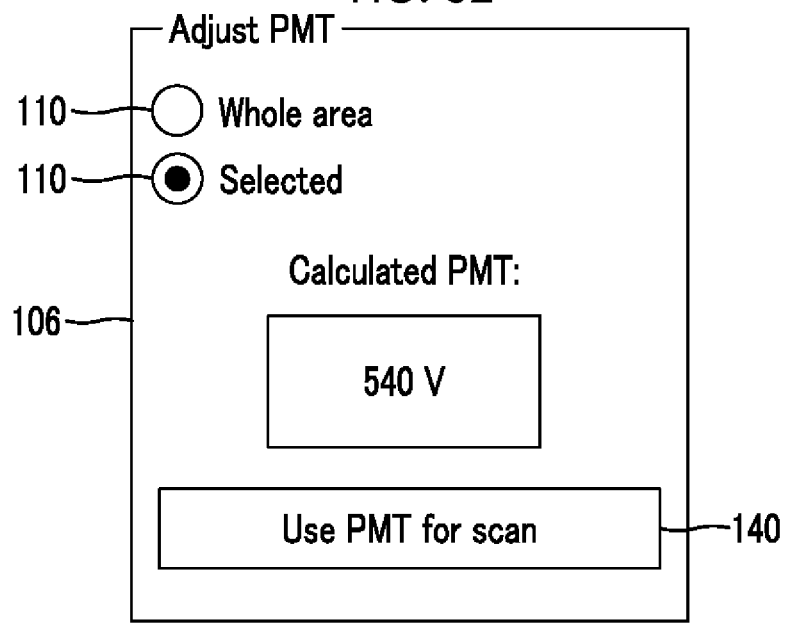
FIG. 32 is a diagram showing an appropriate voltage value display frame in which a setting button is provided.

Also in the manual setting mode, the appropriate voltage value HVM may be able to be set. For example, as shown in FIG. 32, a setting button 140 for setting the appropriate voltage value displayed within the frame as the voltage value of the main scanning conditions is provided in the appropriate voltage value display frame 106. In this manner, even in a case where a mode is mistakenly selected, the appropriate voltage value HVM can be set as the voltage value of the main scanning conditions.

In addition, for example, the small frame 99 may be used as an input box so that the voltage value of the pre-scanning conditions 76P can be set by the user.

In a case where the main scan start button 101 is selected on the screen 90 shown in FIGS. 16 to 18 before a region is designated, the appropriate voltage value HVMall of the entire pre-image may be registered in the temporary scanning conditions 76M, instead of the appropriate voltage value HVM of the region, as main scanning conditions, and the image reading apparatus 11 may be made to perform main scanning. This makes it possible to respond to a case where it is not necessary to designate a region.

Alternatively, without designating a region on the screen 90 shown in FIG. 15, the appropriate voltage value HVMall of the entire pre-image may be registered in the temporary scanning conditions 76M as main scanning conditions, and a mode for making the image reading apparatus 11 to perform the main scanning may be selectable. In this case, in the event that the pre-scan start button 100 is selected on the screen 90 shown in FIG. 15, the image reading apparatus 11 automatically performs pre-scanning to main scanning. On the display 17, the screen 90 for designating a region after the pre-scanning shown in FIGS. 16 to 18 is not displayed, and the screen 90 after the main scanning shown in FIG. 22 is displayed. In this manner, assuming that there is a mode in which pre-scanning to main scanning are automatically performed by one action so that the screen 90 shown in FIG. 15 is directly changed to the screen 90 after the main scanning shown in FIG. 22, it is possible to quickly obtain the main image in a case where there is no need to designate a region.

In each of the above embodiments, an example has been described in which all the functional units, such as the image receiving unit, the calculation unit, and the scanning conditions setting unit, are provided in the CPU 67 of the console 12. However, some or all of the functional units may be provided in the image reading apparatus 11. In a case where some of the functional units are provided in the image reading apparatus 11, the image reading apparatus 11 and the console 12 forma control device. In a case where all of the functional units are provided in the image reading apparatus 11, the image reading apparatus 11 itself functions as a control device.

In a case where all of the functional units are provided in the image reading apparatus 11, the image receiving unit receives the pre-image and the main image from the image memory 56. The region information receiving unit receives the region information that has been transmitted from the console 12 and received by the communication unit 58. The scanning conditions setting unit sets the pre-scanning conditions 76P and the main scanning conditions in the scanning unit 59. The output control unit outputs the pre-image, the main image, and the appropriate voltage value HVM to the console 12 through the communication unit 58. In this case, the console 12 may have a function of displaying the pre-image, the main image, and the appropriate voltage value HVM from the image reading apparatus 11 on the display 17 and a function of setting a region in the pre-image.

The output form of the pre-image, the main image, and the appropriate voltage value HVM is not limited to the display output to the display 17 exemplified in each of the above embodiments, but includes printing output to a paper medium or file output using e-mail or the like.

In the invention, it is also possible to appropriately combine the above-described various embodiments or various modification examples. Without being limited to the embodiments described above, it is needless to say that various configurations can be adopted without departing from the scope of the invention. In addition to the program, the invention also extends to a storage medium that stores the program.

EXPLANATION OF REFERENCES

- 10: image detection system
- 11: image reading apparatus
- 12: console (control device for an image reading apparatus)
- 13: image carrier
- 14: housing
- 15, 16: lid
- 17: display
- 18: operation unit
- 25: stage
- 26: excitation light source
- 26A: excitation light source (red excitation light source)
- 26B: excitation light source (green excitation light source)
- 26C: excitation light source (blue excitation light source)
- 27: light source optical system
- 28: light guiding optical system
- 29: optical head
- 30: filter unit
- 31: photomultiplier
- 32: glass plate
- 33 to 35: collimator lens
- 36, 39, 40: mirror
- 37, 38: dichroic mirror
- 41: holed concave mirror
- 42, 50: concave mirror
- 43: through hole
- 44: substrate
- 45: filter
- 45A: filter (red filter)
- 45B: filter (green filter)
- 45C: filter (blue filter)
- 45D: filter
- 51: aspheric lens
- 55: A/D converter (A/D)
- 56: image memory
- 57: image processing unit
- 58: communication unit
- 59: scanning unit
- 60: controller
- 65: storage device
- 66: memory
- 67: CPU
- 68: communication unit
- 69: data bus
- 75: operation program
- 76P: pre-scanning conditions
- 76M: temporary scanning conditions
- 77: variable table
- 80: image receiving unit
- 81: instruction receiving unit (region information receiving unit)
- 82: information management unit
- 83: calculation unit
- 84: scanning conditions setting unit
- 85: display control unit (output control unit)
- 90: screen
- 91: main display frame
- 92: status display frame
- 93: legend display frame
- 95, 109: pull-down menu
- 96: set display frame
- 97: cursor
- 98, 99, 108: small frame
- 100: pre-scan start button
- 101: main scan start button
- 105: image display frame
- 106: appropriate voltage value display frame
- 107: display selection button
- 110, 122: radio button
- 115: region designation frame
- 120: representative density value display frame
- 121: save button
- 130: check box
- 135: mode switching unit
- 140: setting button
- EL: excitation light
- DL: light
- C2, C3, C5: fluorescent dye
- HVP: voltage value of photomultiplier of pre-scanning conditions
- HVM: appropriate voltage value
- $\alpha$: variable
- S: step
- SP: representative value of density of pre-image
- ST: appropriate density for analysis
- PMM_GA: basic sensitivity coefficient
- PS: pre-scanning
- GP: pre-image
- R: region
- IR: region information
- GP2: region image

What is claimed is:

1. A control device of an image reading apparatus having a photomultiplier that detects light from an image carrier carrying image information, comprising:
   an image receiving unit configured to receive a pre-image and a main image;

a region information receiving unit configured to receive information of a region in the pre-image designated by a user;

a calculation unit configured to calculate a first voltage value of the photomultiplier at which a density of the region becomes a predetermined density; and a scanning conditions setting unit configured to set a plurality of pre-scanning conditions, set a plurality of main scanning conditions, and set the first voltage value as one of the plurality of the main scanning conditions.

2. The control device of an image reading apparatus according to claim 1, wherein the image carrier contains a fluorescently labeled biological substance or a fluorescent protein having a fluorescence property by gene expression, and the light is fluorescence emitted from a fluorescent dye or the fluorescent protein, and at least one excitation light source that emits excitation light of the fluorescent dye or the fluorescent protein and at least one filter that cuts the excitation light and transmits the fluorescence are provided in the image reading apparatus.

3. The control device of an image reading apparatus according to claim 2, wherein a plurality of the excitation light sources having different emission wavelength bands are prepared, and the plurality of excitation light sources are used in the main scanning and the pre-scanning is performed by each of the plurality of excitation light sources.

4. The control device of an image reading apparatus according to claim 3, wherein the image receiving unit is further configured to receive a plurality of the pre-images corresponding to the plurality of excitation light sources, which are output in the pre-scanning performed by each of the plurality of excitation light sources, the region information receiving unit is further configured to receive information of the region for each of the plurality of pre-images, and the calculation unit is further configured to calculate the appropriate voltage value for each of the plurality of regions designated for the plurality of pre-images.

5. The control device of an image reading apparatus according to claim 4, wherein corresponding regions in the plurality of pre-images are designated.

6. The control device of an image reading apparatus according to claim 4, wherein the regions that are different in the plurality of pre-images are designated.

7. The control device of an image reading apparatus according to claim 1, wherein, in the pre-scanning conditions, a resolution of the pre-image lower than a resolution of the main image is set, and/or image processing simpler than image processing performed on the main image is set.

8. The control device of an image reading apparatus according to claim 1, wherein, after the information of the region is received by the region information receiving unit, the scanning conditions setting unit is further configured to set second pre-scanning conditions, which are different from the pre-scanning conditions, for the region, and make the image reading apparatus perform second pre-scanning, and the calculation unit is further configured to calculate the appropriate voltage value based on an image of the region output in the second pre-scanning.

9. The control device of an image reading apparatus according to claim 8, wherein, at least one of the following second pre-scanning conditions is set:

the same resolution as a resolution of the main image of the main scanning conditions is set, and the same image processing as image processing performed on the main image is set.

10. The control device of an image reading apparatus according to claim 1, wherein the calculation unit is further configured to calculate the appropriate voltage value using a calculation equation having at least a representative value of the density of the region and the voltage value of the pre-scanning conditions as variables.

11. The control device of an image reading apparatus according to claim 10, wherein the image carrier contains a fluorescently labeled biological substance or a fluorescent protein having a fluorescence property by gene expression, and the light is fluorescence emitted from a fluorescent dye or the fluorescent protein, and at least one excitation light source that emits excitation light of the fluorescent dye or the fluorescent protein and at least one filter that cuts the excitation light and transmits the fluorescence are provided in the image reading apparatus, a plurality of the excitation light sources having different emission wavelength bands are prepared, and a plurality of the filters having different transmission wavelength bands are prepared, and the calculation equation further has variables regarding a set of the excitation light source and the filter to be used and a resolution of the pre-image and a resolution of the main image.

12. The control device of an image reading apparatus according to claim 1, further comprising:

a mode switching unit configured to perform switching between an automatic setting mode in which the voltage value of the main scanning conditions is automatically set to the appropriate voltage value and a manual setting mode in which a user sets the voltage value of the main scanning conditions.

13. The control device of an image reading apparatus according to claim 1, further comprising:

an output control unit configured to control an output of the pre-image, the main image, and the appropriate voltage value.

14. An operation method of a control device of an image reading apparatus having a photomultiplier that detects light from an image carrier carrying image information, comprising:

an image receiving step of receiving a pre-image and a main image;

a region information receiving step of receiving information of a region in the pre-image designated by a user;

a calculation step of calculating a first voltage value of the photomultiplier at which a density of the region becomes a predetermined density; and a scanning conditions setting step of setting a plurality of pre-scanning conditions, setting a plurality of main scanning conditions, and setting the first voltage value as one of the plurality of the main scanning conditions.

15. An image detection system, comprising:
an image reading apparatus having a photomultiplier that detects light from an image carrier carrying image information;
a console connected to the image reading apparatus;
an image receiving unit configured to receive a pre-image and a main image;
a region information receiving unit configured to receive information of a region in the pre-image designated by a user;
a calculation unit configured to calculate a first voltage value of the photomultiplier at which a density of the region becomes a predetermined density; and
a scanning conditions setting unit configured to set a plurality of pre-scanning conditions, set a plurality of main scanning conditions, and set the first voltage value as one of the plurality of the main scanning conditions.

* * * * *